United States Patent
Khan et al.

(10) Patent No.: US 10,061,581 B2
(45) Date of Patent: Aug. 28, 2018

(54) ON-THE-FLY CONVERSION DURING LOAD/STORE OPERATIONS IN A VECTOR PROCESSOR

(71) Applicant: QUALCOMM Incorporated, San Diego, CA (US)

(72) Inventors: Raheel Khan, Tustin, CA (US); Jun Ho Bahn, San Diego, CA (US); Vijay Bantval, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 229 days.

(21) Appl. No.: 14/170,193

(22) Filed: Jan. 31, 2014

(65) Prior Publication Data

US 2015/0220339 A1    Aug. 6, 2015

(51) Int. Cl.
G06F 9/30    (2018.01)
G06F 9/38    (2018.01)

(52) U.S. Cl.
CPC ...... *G06F 9/30036* (2013.01); *G06F 9/30025* (2013.01); *G06F 9/30032* (2013.01); *G06F 9/30043* (2013.01); *G06F 9/383* (2013.01); *G06F 9/3824* (2013.01); *G06F 9/3875* (2013.01)

(58) Field of Classification Search
None
See application file for complete search history.

(56) References Cited

U.S. PATENT DOCUMENTS

| | | | |
|---|---|---|---|
| 4,141,005 A | 2/1979 | Bonner et al. | |
| 5,053,953 A | 10/1991 | Patel | |
| 5,887,183 A | 3/1999 | Agarwal et al. | |
| 6,266,758 B1 | 7/2001 | Van et al. | |
| 6,807,620 B1 | 10/2004 | Suzuoki et al. | |
| 6,829,696 B1 | 12/2004 | Balmer et al. | |
| 8,484,276 B2 | 7/2013 | Carlson et al. | |
| 2005/0055389 A1* | 3/2005 | Ramanujam | G06F 9/30014 708/204 |
| 2005/0246507 A1 | 11/2005 | Busaba et al. | |
| 2009/0037694 A1 | 2/2009 | Luick et al. | |

(Continued)

FOREIGN PATENT DOCUMENTS

CN    101488083 A    7/2009
EP    0436162 A2    7/1991

(Continued)

OTHER PUBLICATIONS

International Search Report and Written Opinion—PCT/US2015/012528—ISA/EPO—dated Apr. 29, 2015.

*Primary Examiner* — Scott Sun
(74) *Attorney, Agent, or Firm* — Loza & Loza, LLP/Qualcomm

(57) ABSTRACT

Systems and methods for performing on-the-fly format conversion on data vectors during load/store operations are described herein. In one embodiment, a method for loading a data vector from a memory into a vector unit comprises reading a plurality of samples from the memory, wherein the plurality of samples are packed in the memory. The method also comprises unpacking the samples to obtain a plurality of unpacked samples, performing format conversion on the unpacked samples in parallel, and sending at least a portion of the format-converted samples to the vector unit.

30 Claims, 14 Drawing Sheets

(56) References Cited

U.S. PATENT DOCUMENTS

| | | |
|---|---|---|
| 2009/0172349 A1 | 7/2009 | Sprangle et al. |
| 2010/0103180 A1* | 4/2010 | Tamaoki ................... G06T 1/20 |
| | | 345/522 |
| 2010/0106944 A1 | 4/2010 | Symes et al. |
| 2010/0131738 A1 | 5/2010 | Kobori et al. |
| 2010/0149091 A1 | 6/2010 | Kota et al. |
| 2013/0073838 A1 | 3/2013 | Gschwind et al. |
| 2013/0227249 A1* | 8/2013 | Barowski .............. G06F 15/803 |
| | | 712/22 |
| 2014/0013076 A1 | 1/2014 | Ganesh et al. |
| 2015/0046687 A1* | 2/2015 | Gove .................. G06F 9/30036 |
| | | 712/225 |

FOREIGN PATENT DOCUMENTS

| | | |
|---|---|---|
| WO | 2006106342 A2 | 10/2006 |
| WO | 2008126041 A1 | 10/2008 |

* cited by examiner

ON-THE-FLY CONVERSION DURING LOAD/STORE OPERATIONS IN A VECTOR PROCESSOR

BACKGROUND

Field

Aspects of the present disclosure relate generally to load/store operations, and more particularly, to load/store operations in a vector processor.

Background

A vector processor may be used to accelerate processing of baseband signals (e.g., in a wireless device) by performing arithmetic and logic operations on data vectors, in which each data vector comprises a set of data samples. A vector processor may comprise reconfigurable datapaths, logic and arithmetic devices (e.g., adders, multiplexers, accumulators, etc.) that can be programmed to perform various vector operations on data vectors.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a method for loading a data vector from a memory into a vector unit is described herein. The method comprises reading a plurality of samples from the memory, wherein the plurality of samples are packed in the memory. The method also comprises unpacking the samples to obtain a plurality of unpacked samples, performing format conversion on the unpacked samples in parallel, and sending at least a portion of the format-converted samples to the vector unit.

A second aspect relates to an apparatus for loading a data vector from a memory into a vector unit. The apparatus comprises means for reading a plurality of samples from the memory, wherein the plurality of samples are packed in the memory. The apparatus also comprises means for unpacking the samples to obtain a plurality of unpacked samples, means for performing format conversion on the unpacked samples in parallel, and means for sending at least a portion of the format-converted samples to the vector unit.

A third aspect relates to an apparatus for loading a data vector from a memory into a vector unit. The apparatus comprises a controller configured to read a plurality of samples from the memory, wherein the plurality of samples are packed in the memory. The apparatus also comprises unpack logic configured to unpack the samples to obtain a plurality of unpacked samples, and a plurality of format converters, wherein the unpack logic is configured to input each unpacked sample to a respective one of the plurality of format converters, and each format converter is configured to perform format conversion on the respective unpacked sample. The apparatus further comprises an output latch configured to output at least a portion of the format-converted samples to the vector unit.

A fourth aspect relates to a method for storing a data vector from a vector unit in a memory. The method comprises reading a plurality of samples from the vector unit, and performing format conversion on two or more of the samples in parallel. The method also comprises packing the format-converted samples, and sending the packed samples to the memory.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

A vector processor may be used to accelerate processing of baseband signals by performing arithmetic and logic operations on data vectors, in which each data vector comprises a set of data samples. The data vectors may be stored in a memory in a variety of fixed and floating point number formats. In contrast, the vector processor may support only a limited set of arithmetic formats. As a result, when a data vector is retrieved from the memory for vector processing, the data vector may need to undergo format conversion to convert the data vector from the format in which the data vector is stored in the memory to a format suitable for vector processing.

Figure 1:
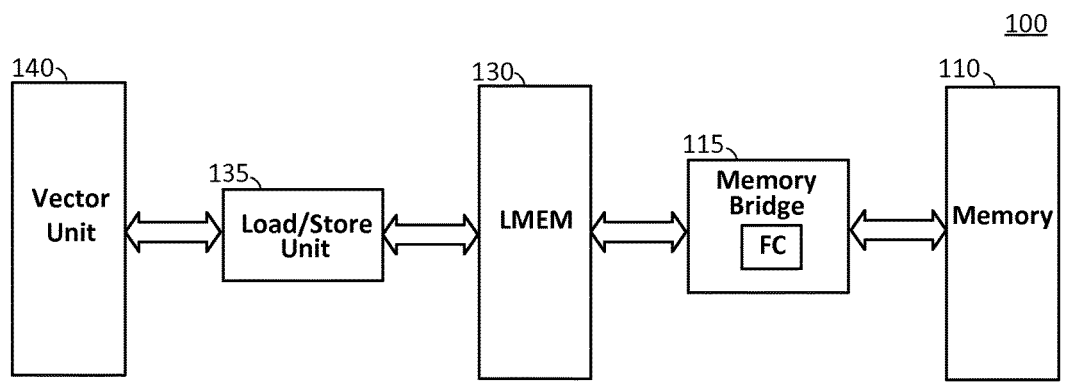
FIG. 1 is a block diagram of a system comprising a memory bridge configured to perform format conversion.

FIG. 1 illustrates one approach for providing format conversion of data vectors in a system 100. The system 100 comprises a memory 110, a memory bridge 115, a local memory (LMEM) 130, a load/store unit 135, and a vector unit 140. The vector unit 140 may comprise reconfigurable datapaths, logic and arithmetic devices (e.g., adders, multiplexers, accumulators, etc.) that can be programmed to perform various vector operations on data vectors. The vector unit 140 may also comprise a vector register file (not shown) for temporarily storing data samples to be processed, and resultant samples (i.e., samples resulting from one or more vector operations performed on one or more data vectors).

In operation, the memory bridge 115 retrieves a data vector from the memory 110, and performs format conversion on the data vector to convert the data vector into a format suitable for vector processing. The memory bridge 115 then stores the format-converted data vector in the LMEM 130 to make the format-converted data vector available to the vector unit 140. When the vector unit 140 needs to process the format-converted data vector, the load/store unit 135 loads the data vector from the LMEM 130 into the vector register file of the vector unit 140. When the vector unit 140 outputs a resultant data vector, the load/store unit 135 stores the resultant data vector in the LMEM 130. The memory bridge 115 retrieves the resultant data vector from the LMEM 130, and performs format conversion on the resultant data vector to convert the resultant data vector into the format in which the resultant data vector is to be stored in the memory 110. The memory bridge 115 then stores the resultant data vector in the memory 110.

A drawback of this approach is that it requires an intermediate memory (e.g., LMEM 130) between the memory 110 and the vector unit 140, which increases the time (number of clock cycles) needed to move data vectors between the memory 110 and the vector unit 140. In addition, the LMEM 130 consumes power and takes up space.

Embodiments of the present disclosure provide on-the-fly format conversion on data vectors during load/store operations. This eliminates the need for temporarily storing format-converted data vectors in an intermediate memory between the vector unit 140 and the memory 110, thereby reducing the time needed to move data vectors between the vector unit 140 and the memory 110.

Figure 2:
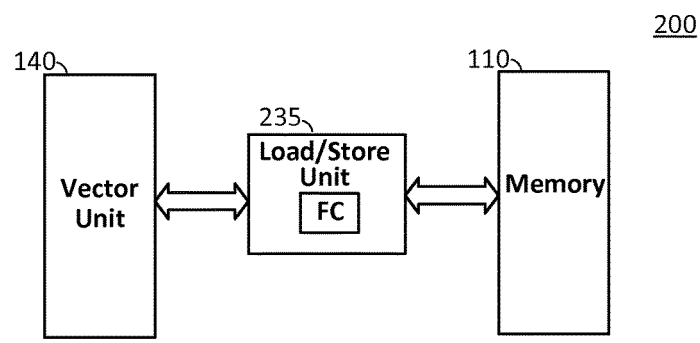
FIG. 2 is a block diagram of a system comprising a load/store unit configured to provide on-the-fly format conversion during load/store operations according to an embodiment of the present disclosure.

FIG. 2 shows a system 200 according to an embodiment of the present disclosure. The system 200 comprises the memory 110, the vector unit 140, and a load/store unit 235. The load/store unit 235 is configured to perform on-the-fly format conversion on a data vector in the process of loading the data vector from the memory 110 into the vector unit 140. The load/store unit 235 is also configured to perform on-the-fly format conversion on a data vector in the process of storing the data vector from the vector unit 140 in the memory 110. The load/store unit 235 may also perform sample realignment, as discussed further below.

Figure 3:
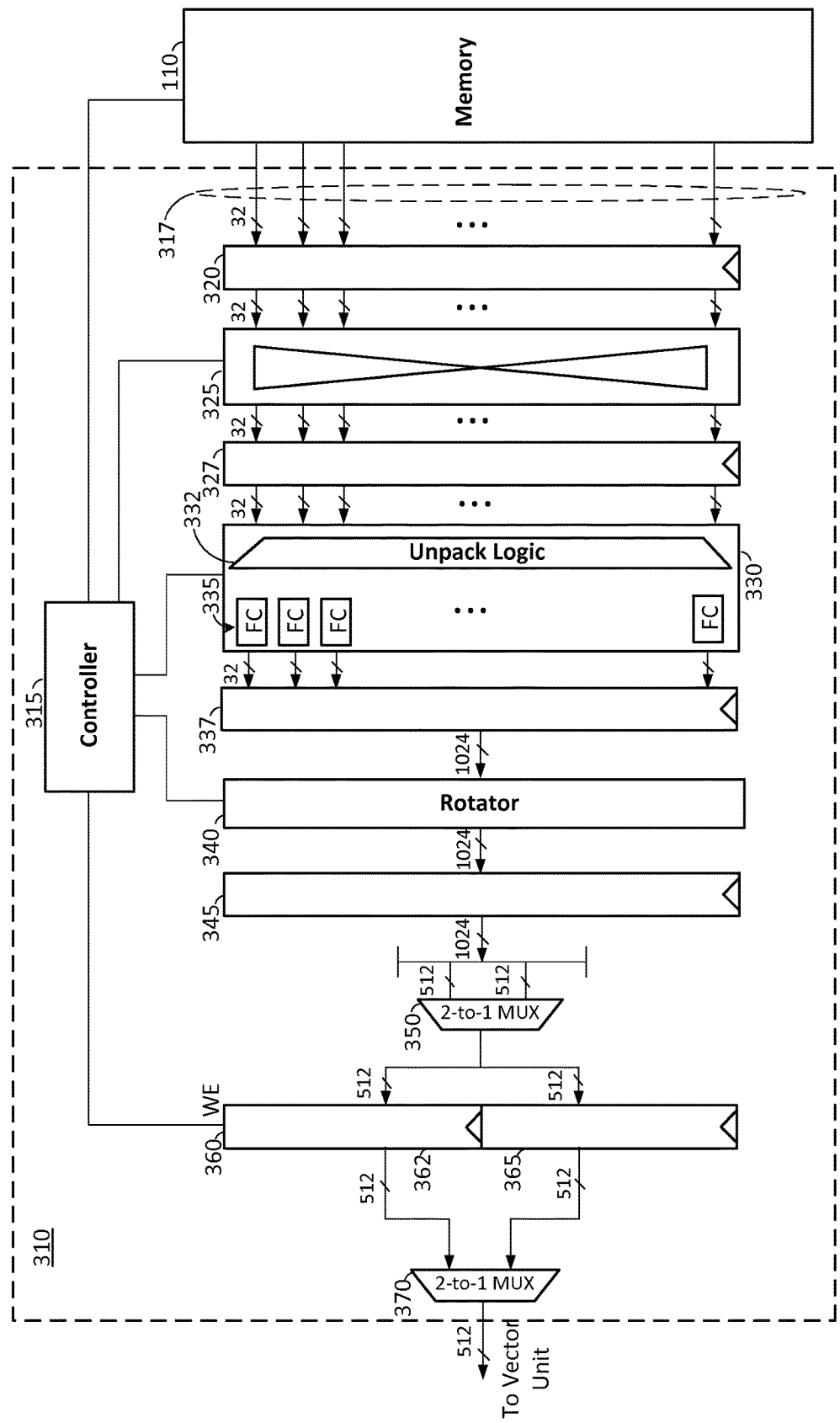
FIG. 3 shows an exemplary implementation of a load path for the load/store unit according to an embodiment of the present disclosure.

FIG. 3 shows an exemplary implementation of a load path 310 of the load/store unit 235 according to an embodiment of the present disclosure. The load path 310 comprises a controller 315, a cross-bar circuit 325, sample-conversion logic 330, a rotator 340, a first multiplexer 350, a second multiplexer 370, and an output latch 360. The sample-conversion logic 330 comprises unpack logic 332, and a plurality of format converters 335. The load path 310 also comprises a first latch 320, a second latch 327, a third latch 337, and a fourth latch 345.

In the example shown in FIG. 1, the memory 110 may be divided into 32 banks, where each bank has a width of 32 bits. The load path 310 may be coupled to the memory 110 via a 1024-bit memory bus 317 comprising 32 32-bit data lanes, where each data lane corresponds to a respective one of the banks of the memory 110. During a load operation, the controller 315 may read data from one or more banks of the memory 110, in which 32 bits are read from each bank. The 32 bits read from each bank are transported on the respective 32-bit data lane of the bus 317. In this example, the controller 315 may read data from a maximum of 32 banks at a time, and thus may read a maximum of 1024 bits at a time. In one aspect, read operations may be limited to bank boundaries. Thus, if the controller 315 accesses a row in a bank during a read operation, then the controller 315 may have to read the entire row in the bank regardless of whether only a portion of the data in the row is needed.

Embodiments of the present disclosure are described below using the above example for ease of discussion. However, it is to be appreciated that embodiments of the present disclosure are not limited to this example, and that embodiments of the present disclosure can be used with a memory comprising a different number of banks and/or having a different bank width.

In one aspect, a data vector in the memory 110 may comprise a set of data samples, where each sample comprises a number of bits that is less than a bank width (e.g., 32 bits). For example, each sample may comprise 8 bits, 10 bits, 12 bits, 16 bits, 20 bits, or 24 bits. In this aspect, the samples may be packed together in the memory 110 to conserve memory space. For example, the samples may be packed in the memory 110 with no empty memory space between adjacent samples.

During a load operation, the controller 315 may read a plurality of samples (e.g., 32 samples) from the memory 110. If each sample comprises a number of bits that is less than the bank width (e.g., 32 bits), then the controller 315 may read the samples from a subset of the banks. For example, the controller 315 may read 32 10-bit samples from 10 banks, 32 12-bits samples from 12 banks, 32 16-bit samples from 16 banks, etc.

The first latch 320 latches the read samples, and outputs the latched samples to the cross-bar circuit 325 via a plurality of data lanes (e.g., 32 32-bit data lanes). The cross-bar circuit 325 is configured to reroute the data lanes on which the samples are transported. For example, the cross-bar circuit 325 may be configured to couple any one of the data lanes at the input of the cross-bar circuit 325 to any one of the data lanes at the output of the cross-bar circuit 325. The controller 315 may use the cross-bar circuit 325 to concatenate samples read from the memory 110, as discussed further below.

The second latch 327 latches the samples from the cross-bar circuit 325, and outputs the latched samples to the unpack logic 332. The unpack logic 332 unpacks the samples, and provides each unpacked sample to a respective one of the format converters 335. To do this, the controller 315 may send an instruction to the unpack logic 332 indicating the width (size) of each sample (e.g., 8 bits, 10 bits, 12 bits, 16 bits, 20 bits, or 24 bits). This allows the unpack logic 332 to determine the boundaries between samples, and therefore unpack the samples.

The format converters 335 perform format conversion on the samples from the unpack logic 332 in parallel, in which each format converter 335 converts the format of the respective sample. For the example in which 32 samples are read from the memory 110 at a time, the load path 310 may comprise 32 format converters 335 for performing format conversion on the 32 samples in parallel.

Each format converter 335 may convert the numerical format of the respective sample. For example, each format converter 335 may convert the respective sample from a floating point number format to a fixed point number format, or vice versa. Each format converter 335 may also change the width (size) of the respective sample. For example, each format converter 335 may increase the width (size) of the respective sample by padding the sample with zeros, as discussed further below. In one aspect, the controller 315 may send an instruction to the format converters 335 indicating the format of the samples in the memory 110 and the format of the samples for vector processing so that the format converters 335 perform the appropriate format conversion. Each format converter 335 outputs the respective format-converted sample on a respective data lane (e.g., 32-bit data lane), as shown in FIG. 3.

The third latch 337 latches the format-converted samples from the format converters 335, and outputs the latched samples to the rotator 340. For ease of illustration, individual data lanes are not shown in FIG. 3 after the third latch 337. The rotator 340 is configured to shift the positions of the samples. For example, the rotator 340 may shift the positions of the samples to properly align the samples with data lanes in the vector unit 140, as discussed further below. In one aspect, the controller 315 may send an offset value to the rotator 340 indicating the number of sample positions by which to shift the samples.

The fourth latch 345 latches the shifted samples from the rotator 340, and outputs the latched samples to the first multiplexer 350. In one aspect, the output latch 360 comprises a first output latch 362 and a second output latch 365, where each latch 362 and 365 may hold half the samples (e.g., 16 samples) from the rotator 340 at a time. In this aspect, the first multiplexer 350 outputs a first half of the samples and a second half of the samples to the output latch 360 at different times (e.g., on different clock cycles). When the multiplexer 350 outputs the first half of the samples, the first output latch 362 may latch the first half of the samples, and when the multiplexer 350 outputs the second half of the samples, the second output latch 365 may latch the second half of the samples.

The second multiplexer 370 may selectively couple the first and second output latches 362 and 365 to the vector unit 140. For example, the second multiplexer 370 may couple the first and second output latches 362 and 365 to the vector unit 140 on different clock cycles. When the second multiplexer 370 couples the first output latch 362 to the vector unit 140, the first output latch 362 may output the first half of the samples (e.g., 16 samples) to the vector unit 140, and when the second multiplexer 370 couples the second output latch 365 to the vector unit 140, the second output latch 365 may output the second half of the samples (e.g., 16 samples) to the vector unit 140. Thus, in this embodiment, the samples may be divided into two halves, which are sent to the vector unit 140 one at a time. This allows the vector unit 140 to have half the width (e.g., 512 bits) of the memory 110. In this embodiment, the output latch 360 may operate at twice the clock frequency as the other latches 320, 327, 336 and 345. This allows the output latch 360 to output samples at the same rate as the other latches even though the output latch 360 only outputs half as many samples at a time.

In one embodiment, the output latch 360 has write-enable functionality that allows the controller 315 to selectively enable writing in individual sample spaces in the output latch 360. As discussed further below, this allows the controller 315 to selectively combine samples from two different read operations to construct a desired set of samples to be loaded into the vector unit 140.

Various operations of the load path 310 will now be described in further detail by way of examples. It is to be appreciated that the examples are merely illustrative and non-limiting.

In one example, the controller 315 may load 32 12-bit samples from the memory 110 into the vector unit 140. In this example, the 32 12-bit samples comprise a total of 384 bits (32×12 bits), which may be packed together in the memory 110 and stored in 12 banks of the memory 110. A first one of the banks may store a first one of the samples, a second one of the samples, and 8-bits of a third one of the samples, a second one of the banks may store the remaining 4-bits of the third one of the samples, a fourth one of the samples, a fifth one of the samples, and 4-bits of a sixth one of the samples, and so forth.

Figure 4:
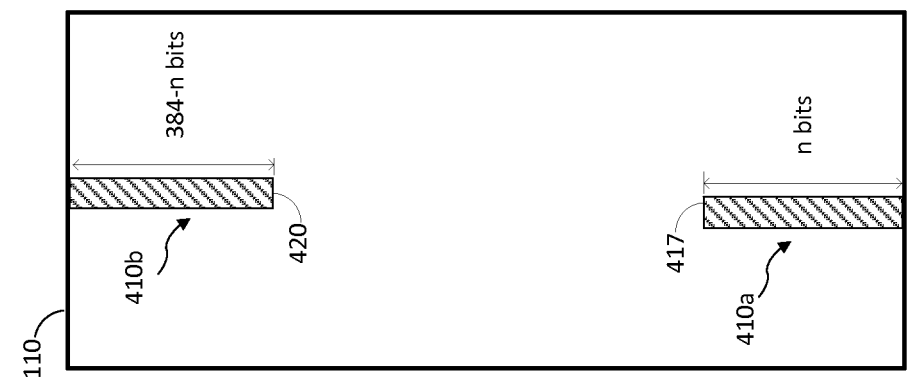
FIG. 4 shows an example of a data vector in a memory according to an embodiment of the present disclosure.

FIG. 4 shows an example of the 32 12-bits samples stored in the memory 110. In this example, the samples are split into two portions 410a and 410b occupying two different rows in the memory 110. This may occur, for example, when there is not enough free space in a row to write all of the samples in the row. The first portion 410a comprises n bits and the second portion 410b comprises 384-n bits, as shown in FIG. 4. Each portion 410a and 410b may span a multiple of the bank width (e.g., 32 bits).

Figure 5:
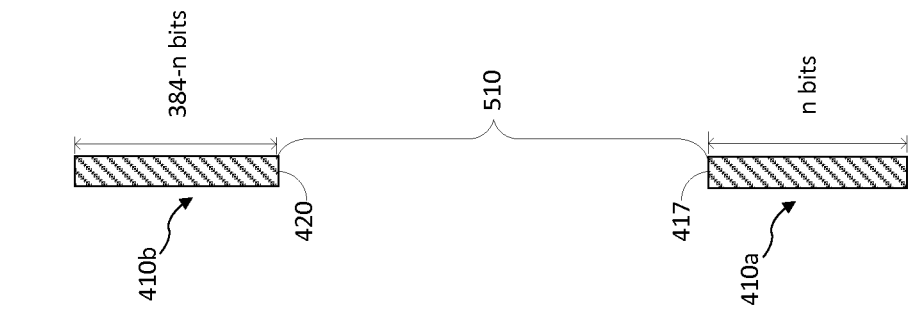
FIG. 5 shows an example of the data vector being read out of the memory according to an embodiment of the present disclosure.

The controller 315 may read out the two portions 410a and 410b of the samples from the memory 110. The two portions 410a and 410b may be transported on 12 data lanes of the memory bus 317, as shown in FIG. 5. In this example, there is a space 510 between the two portions 410a and 410b of the samples on the bus 317. This is because the banks storing the first and second portions 410a and 410b of the samples in the memory 110 are separated by a plurality of banks (e.g., 20 banks).

The first latch 320 latches the read samples, and provides them to the cross-bar circuit 325. The cross-bar circuit 325 concatenates the first and second portions 410a and 410b of the samples into contiguous samples 610 by rerouting the data lanes on which the first and second portions 410a and 410b of the samples are transported, as shown in FIG. 6.

Figure 6:
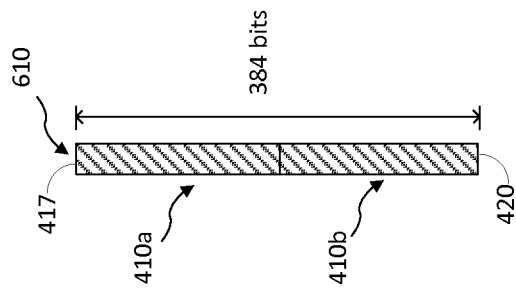
FIG. 6 shows an example in which samples of the data vector are concatenated by a cross-bar circuit according to an embodiment of the present disclosure.

The cross-bar circuit 325 may also reposition the first and second portions 410a and 410b with respect to each other, as shown in FIG. 6. This may be done, for example, so that the concatenated samples 610 are consecutively ordered. For example, the first one of the samples may start at boundary 417 of the first portion 410a of the samples, and the last one of the samples may end at boundary 420 of the second portion 410b of the samples, as shown in FIG. 4. In this example, the cross-bar circuit 325 may reposition the first and second portions 410a and 410b with respect to each other so that the first and last samples are located at the boundaries 417 and 420, respectively, of the concatenated samples 610, as shown in FIG. 6.

Figure 7:
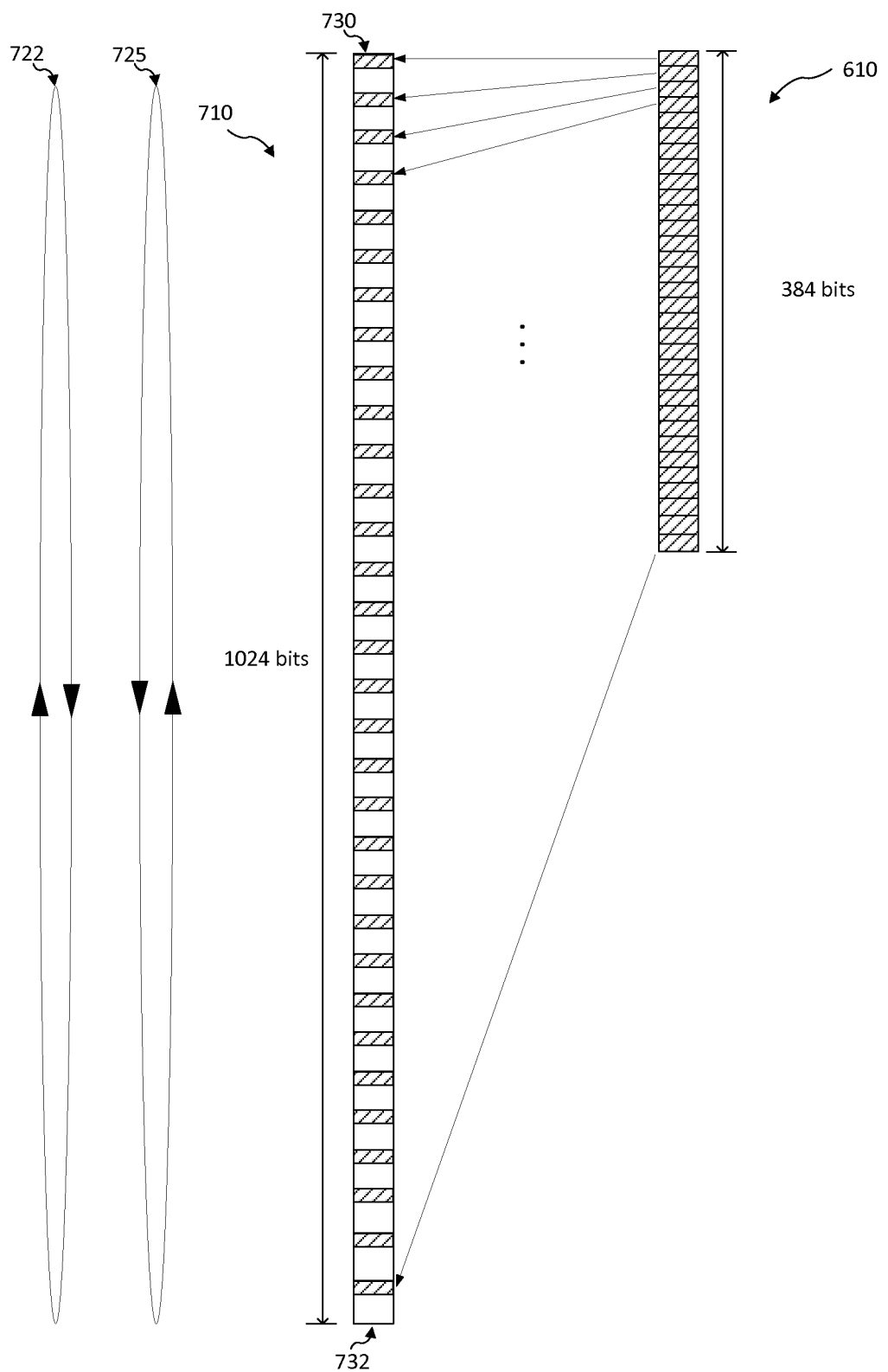
FIG. 7 shows an example in which the widths of samples are expanded by padding the samples with zeros according to an embodiment of the present disclosure.

The second latch 327 latches the concatenated samples 610 from the cross-bar circuit 325, and provides them to the unpack logic 332. The unpack logic 332 unpacks the 12-bit samples, and provides each unpacked 12-bit sample to a respective one of the format converters 335. Each format converter 335 may convert the respective 12-bit sample into a 32-bit sample. In one example, this may be accomplished by simply padding each 12-bit sample with 20 zeros. In this regard, FIG. 7 shows an example in which the 32 12-bit samples 610 are converted into 32 32-bit samples 710 by padding each 12-bit sample with zeros. This may be referred to as sample-width expansion. In another example, the format converters 335 may also convert the numerical format of the 12-bit samples, such as converting the 12-bit samples from a floating point number format to a fixed point number format, or vice versa. Each format-converted sample is output to a respective data lane (e.g., 32-bit data lane), as discussed above.

The third latch 337 latches the format-converted samples from the format converters 335, and provides them to the rotator 340. The rotator 340 may shift the positions of the samples, for example, to properly align the samples with data lanes in the vector unit 140. To do this, the rotator 340 may rotate the samples in either rotational direction 722 and 725 shown in FIG. 7. For example, if the samples are rotated by one sample position in rotational direction 722, then the sample at the top 730 is moved to the bottom 732, and the rest of the samples are shifted up by one position. In another example, if the samples are rotated by one sample in rotational direction 725, then the sample at the bottom 732 is moved to the top 730, and the rest of the samples are shifted down by one position. It is to be appreciated that the samples may be shifted in either direction to achieve a desired sample alignment.

Figure 8:
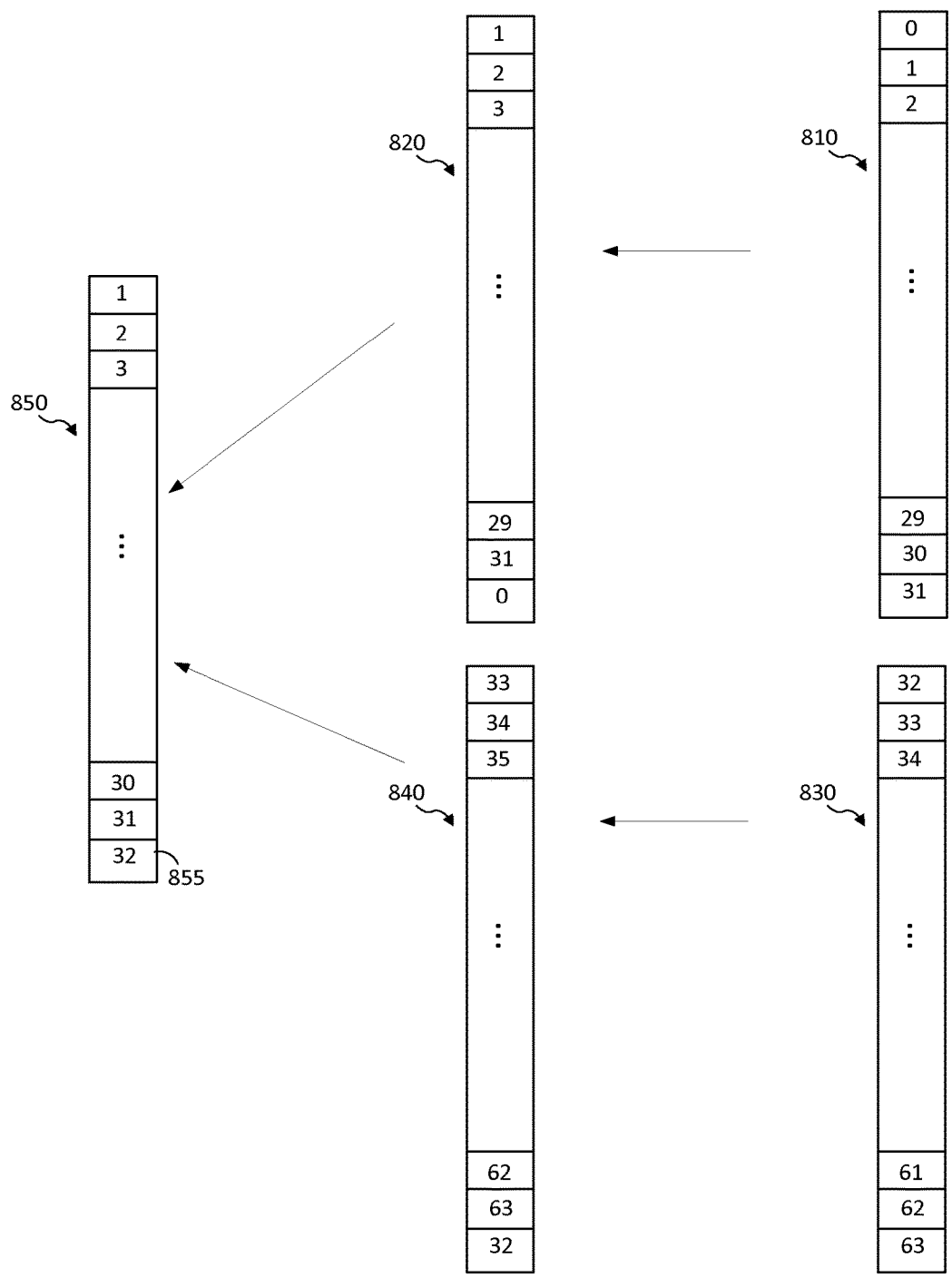
FIG. 8 shows an example in which samples from two read operations are shifted and selectively combined to construct a desired set of samples for loading into a vector unit according to an embodiment of the present disclosure.

As discussed above, the controller 315 can use the write-enable functionality of the output latch 360 to selectively combine samples from two different read operations to construct a desired set of samples to be loaded into the vector unit 140. This may be explained by way of the following example with reference to FIG. 8. FIG. 8 shows a desired set of samples 850 to be loaded into the vector unit 140. In this example, the desired set of samples 850 comprises samples 1 to 32.

FIG. 8 also shows first and second sets of samples 810 and 830 that are input to the rotator 340 at different times by the third latch 327. The first and second sets 810 and 830 correspond to first and second read operations, respectively. In this example, the first set of samples 810 comprises samples 0 to 31, and the second set of samples 830 comprises samples 32 to 63. The first set of samples 810 comprises sample 0 even though sample 0 is not in the desired set of samples 850. This may be due to the fact that sample 0 and sample 1 are located in the same bank in the memory 110, and the first read operation is limited to bank boundaries. As a result, the controller 315 may not be able to read sample 1 from the memory 110 without also reading sample 0.

Operations for achieving the desired set of samples 850 from the first and second sets of samples 810 and 830 will now be described according to one embodiment. The rotator 340 receives the first set of samples 810 and shifts (rotates) the positions of the samples in the first set of samples 810 to align samples 1 to 31 with their corresponding positions in the desired set of samples 850. The resulting shifted set of samples 820 is written to the output latch 360. Thus, at this point, the shifted set of samples 820 is held in the output latch 360.

The rotator 340 then receives the second set of samples 830 and shifts (rotates) the positions of the samples to align sample 32 with the corresponding position in the desired set of samples 850. The controller 315 may selectively write sample 32 from the resulting shifted set of samples 840 to the output latch 360 using a write enable signal. In this example, the write enable signal only enables writing in the position 855 corresponding to sample 32. Thus, only sample 32 from the shifted set of samples 840 is written to the output latch 360, and samples 1-31 from the previous write operation remain in the output latch 360. As a result, the desired set of samples 850 is constructed in the output latch 360. The desired set of samples 850 may then be output to the vector unit 140.

In general, a desired set of samples may be constructed in the output latch 360 by selectively combining samples from a first set of samples and a second set of samples corresponding to different read operations. More particularly, the rotator 340 may shift (rotate) the first set of samples to align one or more samples in the first set of samples with their corresponding positions in the desired set of samples, resulting in a first shifted set of samples. The first shifted set of samples may then be written to the output latch 360. The rotator 340 may then shift (rotate) the second set of samples to align one or more samples in the second set of samples with their corresponding positions in the desired set of samples, resulting in a second shifted set of samples. The controller 315 may then construct the desired set of samples by selectively writing one or more samples in the second shifted set of samples to the output latch 360. More particularly, the controller 315 enables writing in sample spaces in the output latch 360 corresponding to the one or more samples in the second shifted set of samples to be written to the output latch 360.

Figure 9:
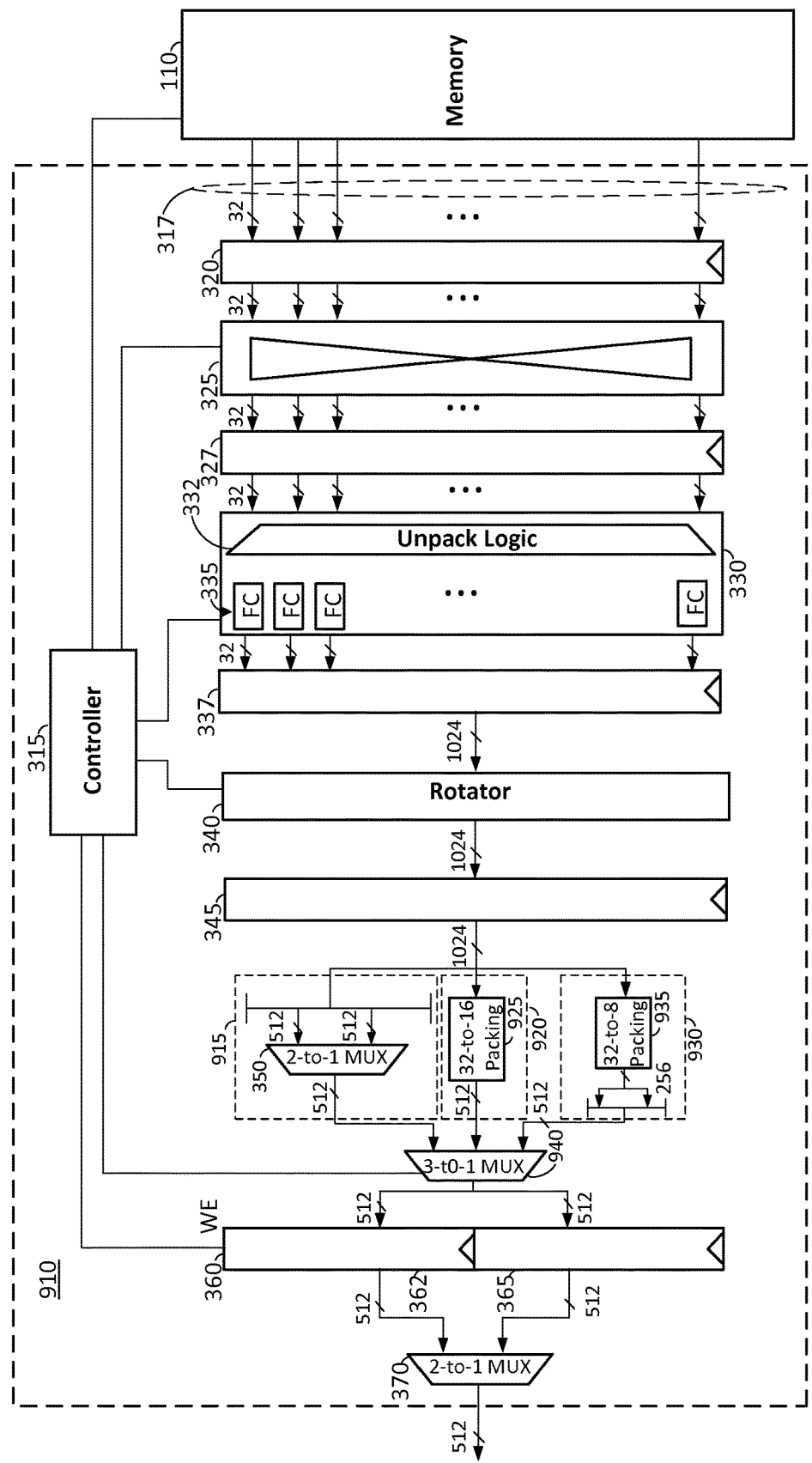
FIG. 9 shows a load path comprising logic for outputting samples of different widths to the vector unit according to an embodiment of the present disclosure.

FIG. 9 shows a load path 910 according to another embodiment of the present disclosure, in which the load path 910 is capable of outputting samples to the vector unit 140 in any one of a plurality of different sample widths. In the example shown in FIG. 9, the load path 910 is capable of selectively outputting 32-bit samples, 16-bit samples or 8-bit samples to the vector unit 140. Thus, in this example, the load/store unit 235 supports three different sample widths for the vector unit 140.

The load path 910 comprises a first datapath 915, a second datapath 920, a third datapath 930, and a datapath multiplexer 940. The first datapath 915, the second datapath 920, and the third datapath 930 are used to output 32-bit samples, 16-bit samples, and 8-bit samples, respectively, to the vector unit 140. The datapath multiplexer 940 is configured to selectively couple one of the first, second, third datapaths 915, 920 and 930 to the output latch 360 depending on the desired sample width.

The first datapath 915 is similar to the datapath between the fourth latch 345 and the output latch 360 shown in FIG. 3. The second datapath 920 comprises 32-to-16 bit packing logic 925, and the third datapath 930 comprises 32-to-8 bit packing logic 935.

In this embodiment, the fourth latch 345 may output 32-bit samples regardless of which datapath 915, 920 and 930 is selected by the multiplexer 940. When the second datapath 920 is selected, each 32-bit sample may comprise a 16-bit sample padded with 16 zeros. In this case, the format converters 335 may convert each sample from the unpack logic into a 16-bit sample and pad the 16-bit sample with 16 zeros to generate a 32-bit sample. When the third datapath 930 is selected, each 32-bit sample may comprise an 8-bit sample padded with 24 zeros. In this case, the format converters 335 may convert each sample from the unpack logic into an 8-bit sample and pad the 8-bit sample with 24 zeros to generate a 32-bit sample. Thus, in this embodiment, the format converters 335 may convert samples from the unpack logic 332 into 32-bit samples regardless of which sample width is selected for the vector unit 140. This may be done to simplify the architecture of the load path 910.

When a sample width of 32 bits is selected, the controller 315 instructs the multiplexer 940 to couple the first datapath 915 to the output latch 360. The samples from the fourth latch 345 are divided into two halves (512 bits each), which are sent to the output latch 360 one at a time, as discussed above.

When a sample width of 16 bits is selected, the controller 315 instructs the multiplexer 940 to couple the second datapath 920 to the output latch 360. The 32-to-16 packing logic 925 reduces the width of each sample from 32 bits to 16 bits by removing 16 bits of padding (e.g., zeros) from the sample. In the example shown in FIG. 9, the 32-to-16 packing logic 925 packs the resulting samples into 512 bits. In other words, the 32-to-16 packing logic converts 32 32-bit samples spanning 1024 bits into 32 16-bit samples spanning 512 bits. The 32 16-bit samples may be held in one of the first and second output latches 360, and sent to the vector unit 140 at one time (e.g., in one clock cycle).

When a sample width of 8 bits is selected, the controller 315 instructs the multiplexer 940 to couple the third datapath 930 to the output latch 360. The 32-to-8 packing logic 935 reduces the width of each sample from 32 bits to 8 bits by removing 24 bits of padding (e.g., zeros) from the sample. In the example shown in FIG. 9, the 32-to-8 packing logic 935 packs the resulting samples into 256 bits. In other words, the 32-to-8 packing logic converts 32 32-bit samples spanning 1024 bits into 32 8-bit samples spanning 256 bits. The 32 8-bit samples may be duplicated to generate 64 8-bit samples spanning 512 bits. The 64 8-bits may be held in one of the first and second output latches 360, and sent to the vector unit 140 at one time (e.g., in one clock cycle).

Figure 10:
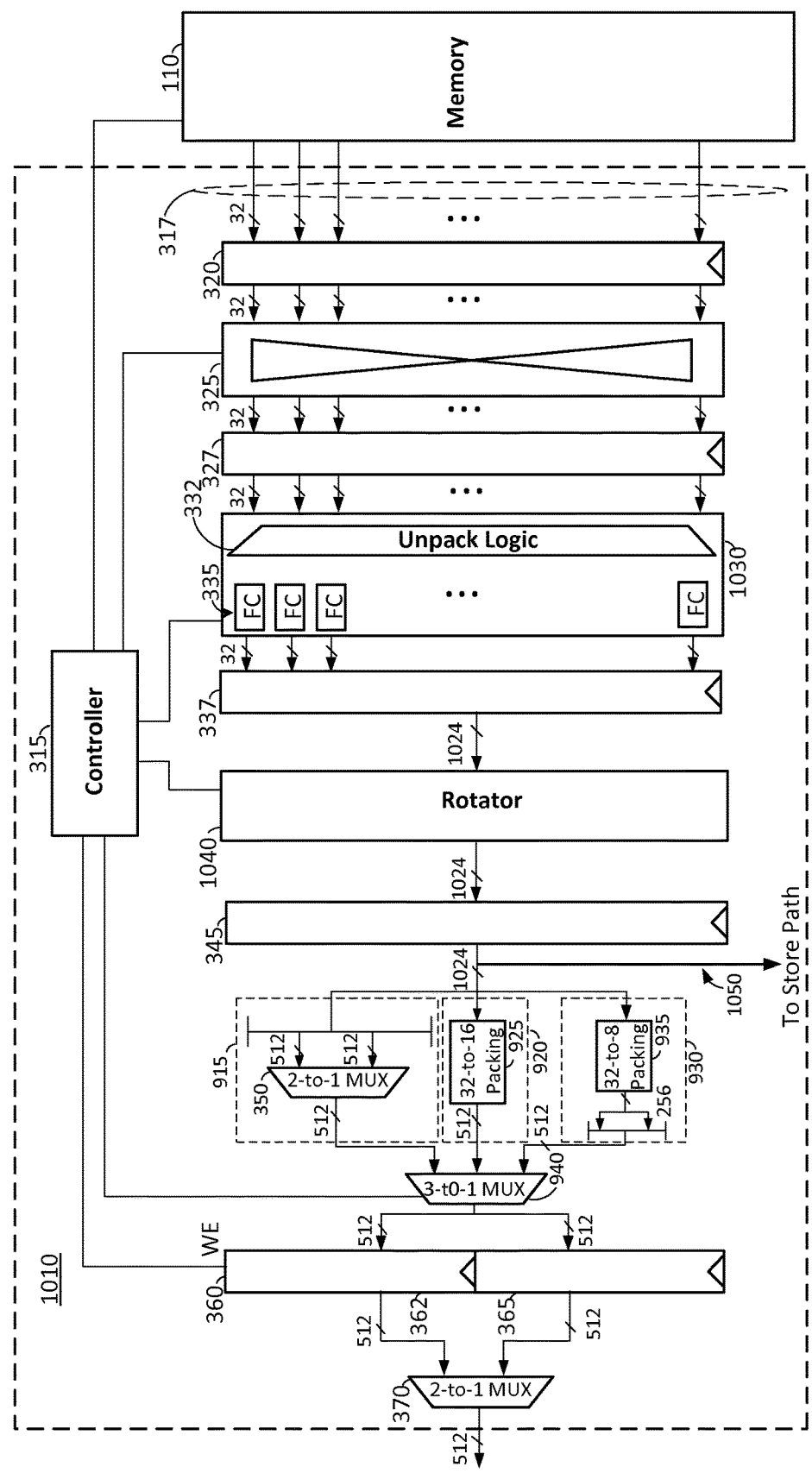
FIG. 10 shows a load path capable of selectively operating in a format-conversion mode or a bypass mode according to an embodiment of the present disclosure.

FIG. 10 shows a load path 1010 according to another embodiment of the present disclosure. The load path 1010 includes a path 1050 from the fourth latch 345 to a store path (shown in FIG. 13) of the load/store unit 235. As discussed further below, path 1050 enables the load/store unit 235 to perform read-modify-write operations.

In this embodiment, the load path 1010 is capable of selectively operating in a format-conversion mode or a bypass mode. In the format-conversion mode, the load path 1010 operates in the same manner as the load path 910 in FIG. 9. In the bypass mode, the load path 1010 loads data samples from the memory 110 into the vector unit 140 without format conversion. This mode may be selected, for example, when the samples are stored in the memory 110 in a format that is already suitable for vector processing.

In the example shown in FIG. 10, the load path 1010 is capable of operating in the bypass mode for 8-bit samples or 16-bit samples that do not require format conversion. Operations of the load path 1010 in the bypass mode will now be described by way the following examples, although it is to be appreciated that embodiments of the present disclosure are not limited to these examples.

For 16-bit samples that do not require format conversion, the controller 315 may read out a maximum of 64 16-bit samples from 32 banks of the memory 110 at a time for a total of 1024 bits. The first latch 320 latches the read samples, and provides them to the cross-bar circuit 325. The cross-bar circuit 325 may reroute the data lanes on which samples are transported, as discussed above. The second latch 327 latches the samples from the cross-bar circuit 325, and provides them to the sample-conversion logic 1030. In the bypass mode, the sample-conversion logic 1030 may simply pass the samples to the rotator 1040 without unpacking the samples and performing format-conversion on the samples. In other words, the samples may bypass the unpack logic 332 and the format converters 335.

The rotator 1040 may shift the positions of the samples, for example, to properly align the samples with data lanes in the vector unit 140. To do this, the rotator 1040 may rotate the samples by a multiple of 16 bits in either rotational direction to achieve the desired alignment.

The fourth latch 345 latches the shifted samples from the rotator 1040, and outputs the latched samples. In the bypass mode, the multiplexer 940 selects the first datapath 915, in which the shifted samples are divided into first and second halves that are latched in the first and second output latches 362 and 365, respectively. The first and second halves may be output to the vector unit 140 at different times (e.g., in different clock cycles). Since the samples are not unpacked in the bypass mode, each half of the samples may comprise 32 16-bit samples spanning 512 bits.

Figure 11:
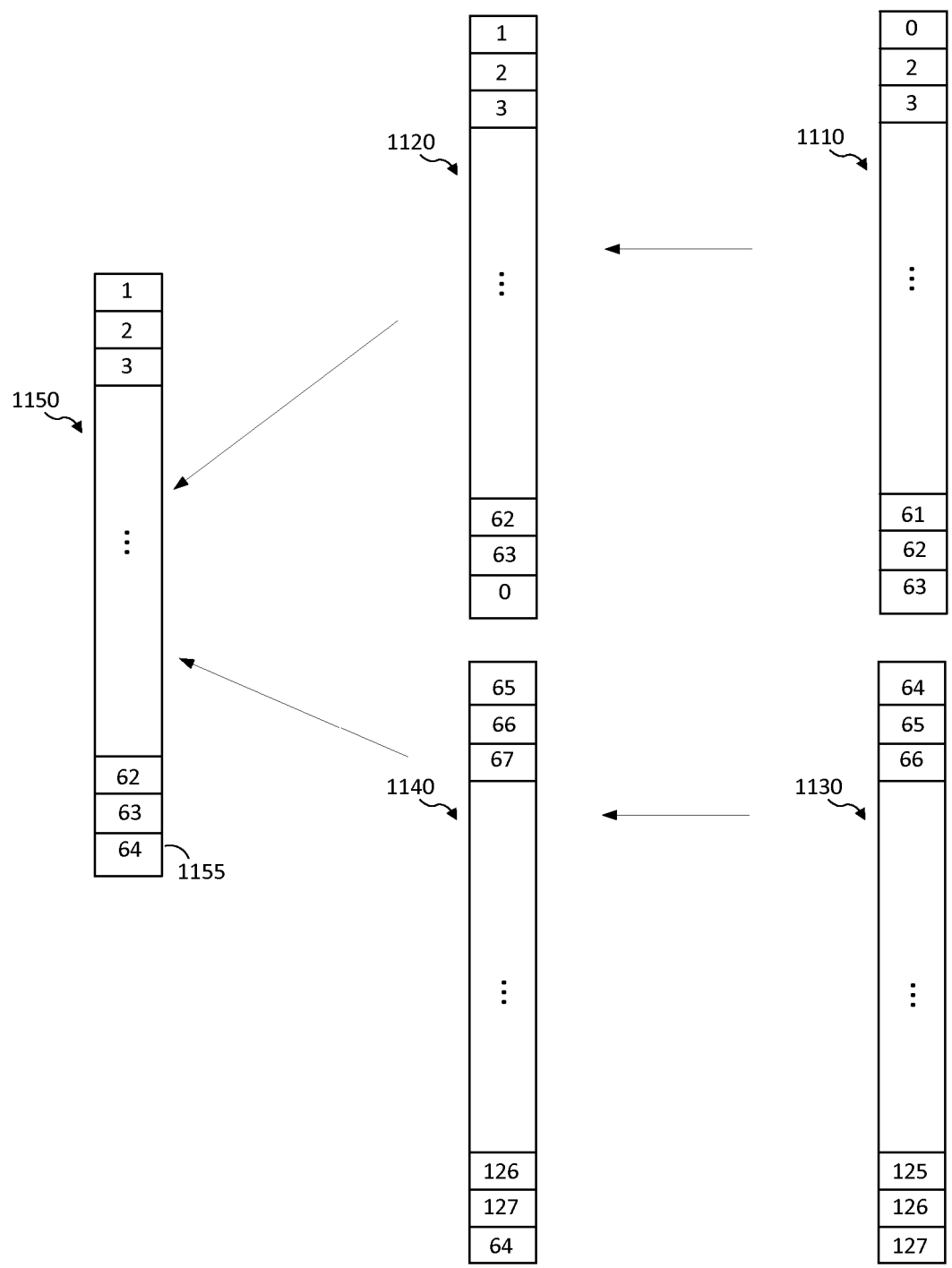
FIG. 11 shows an example in which samples from two read operations are shifted and selectively combined in the bypass mode according to an embodiment of the presented invention.

In this example, the controller 315 can use the write-enable functionality of the output latch 360 to selectively combine 16-bit samples from two read operations to construct a desired set of 16-bit samples to be loaded into the vector unit 140. This may be explained by way of the following example with reference to FIG. 11. FIG. 11 shows a desired set of samples 1150 to be loaded into the vector unit 140. In this example, the desired set of samples 1150 comprises samples 1 to 64.

FIG. 11 also shows first and second sets of samples 1110 and 1130 that are input to the rotator 1040 at different times and correspond to first and second read operations, respectively. The first set of samples 1110 comprises samples 0 to 63, and the second set of samples 1130 comprises samples 64-127. In this example, it may not be possible to read samples 1 to 64 in a single read operation because sample 1 is not aligned with a bank boundary in the memory 110.

Operations for achieving the desired set of samples 1150 from the first and second sets of samples 1110 and 1130 will now be described according to one embodiment. The rotator 1040 receives the first set of samples 1110 and shifts (rotates) the positions of the samples in the first set of samples 1110 to align samples 1 to 63 with their corresponding positions in the desired set of samples 1150. In this example, the samples are shifted by one sample position (16 bits). The resulting shifted set of samples 1120 is written to the output latch 360. Thus, at this point, the shifted set of samples 1120 is held in the output latch 360.

The rotator 1040 then receives the second set of samples 1130 and shifts (rotates) the positions of the samples in the second set of samples 1130 to align sample 64 with the corresponding position in the desired set of samples 1150. The controller 315 may selectively write sample 64 from the resulting shifted set of samples 1140 to the output latch 360 using a write enable signal, in which the write enable signal only enables writing in the position 1155 corresponding to sample 64. As a result, the desired set of samples 1150 is constructed in the output latch 360. The desired set of samples 1150 may then be output to the vector unit 140.

For 8-bit samples that do not require format conversion, the controller 315 may read out a maximum of 128 8-bit samples from 32 banks of the memory 110 at a time for a total of 1024 bits. The first latch 320 latches the read samples, and provides them to the cross-bar circuit 325. The cross-bar circuit 325 may reroute the data lanes on which the samples are transported, as discussed above. The second latch 327 latches the samples from the cross-bar circuit 325, and provides them to the sample-conversion logic 1030. In the bypass mode, the sample-conversion logic 1030 may simply pass the samples to the rotator 1040 without unpacking the samples and performing format-conversion on the samples.

The rotator 1040 may shift the positions of the samples, for example, to properly align the samples with data lanes in the vector unit 140. To do this, the rotator 1040 may rotate the samples by a multiple of 8 bits in either rotational direction to achieve the desired alignment. For example, the rotator 1040 may rotate the samples by three sample positions by rotating the samples by 24 bits.

The fourth latch 345 latches the shifted samples from the rotator 1040, and outputs the latched samples. In the bypass mode, the multiplexer 940 selects the first datapath 915, in which the shifted samples are divided into first and second halves that are latched in the first and second output latches 362 and 365, respectively. The first and second halves may be output to the vector unit 140 at different times (e.g., in different clock cycles). Since the samples are not unpacked in the bypass mode, each half of the samples may comprise 64 8-bit samples spanning 512 bits.

In this example, the controller 315 can use the write-enable functionality of the output latch 360 to selectively combine 8-bit samples from two read operations to construct a desired set of 8-bit samples to be loaded into the vector unit 140. This may be done in a similar manner as described above for 16-bit samples.

Figure 12:
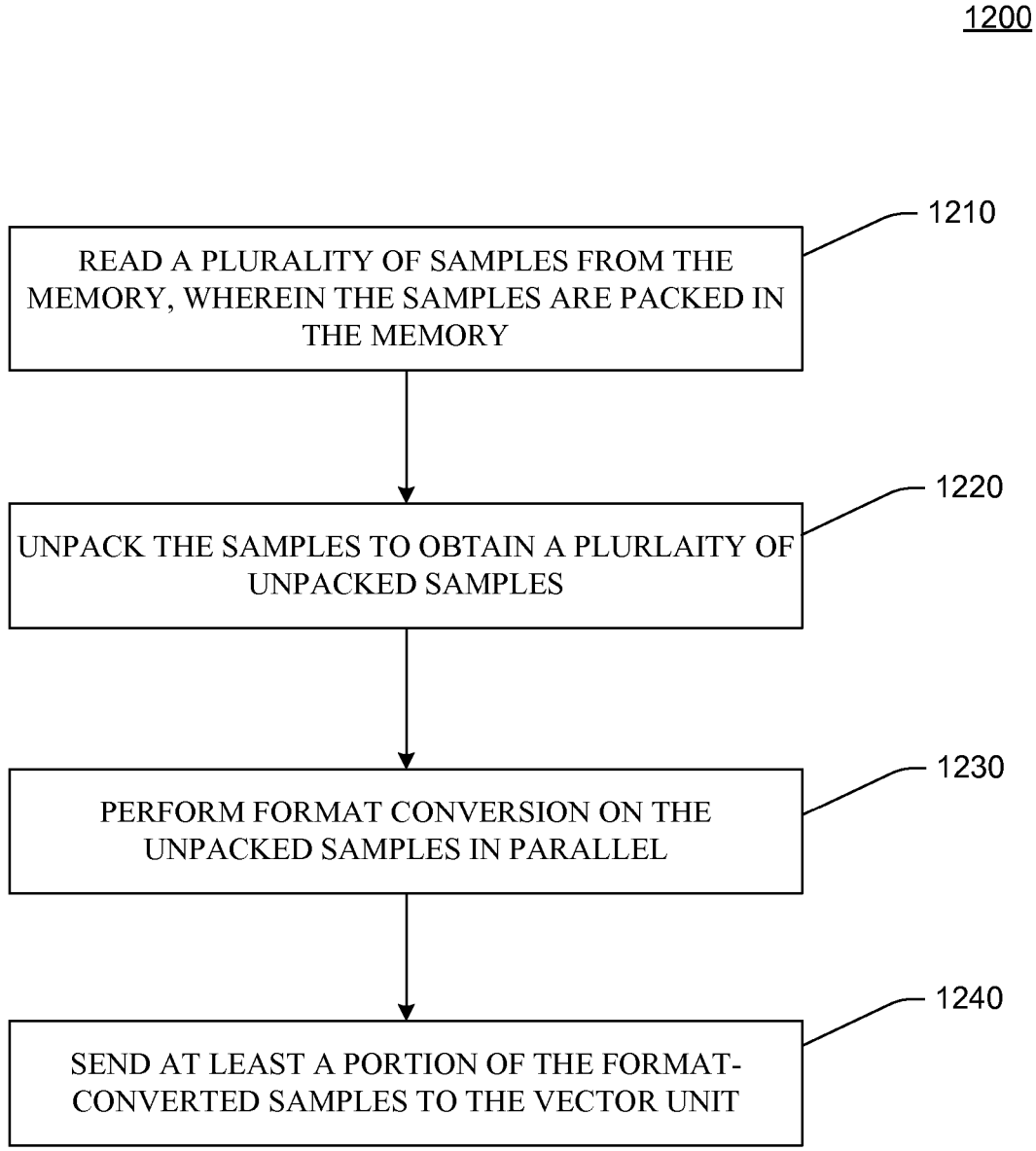
FIG. 12 is a flow diagram illustrating a method for loading data samples into a vector unit according to an embodiment of the present disclosure.

FIG. 12 is a flow diagram illustrating a method 1200 for loading data samples into a vector unit according to an embodiment of the present disclosure.

In step 1210, a plurality of samples are read from the memory, wherein the samples are packed in the memory. For example, the samples may be packed together with no memory space between adjacent samples.

In step 1220, the samples are unpacked to obtain a plurality of unpacked samples. For example, the samples may be unpacked by unpack logic (e.g., unpack logic 332).

In step 1230, format conversion is performed on the unpacked samples in parallel. For example, each unpacked sample may be input to a respective one of a plurality of format converters (e.g., format converters 335), where each format converter performs format conversion on the respective unpacked sample.

In step 1240, at least a portion of the format-converted samples is sent to the vector unit. The format-converted samples may be shifted (e.g., by the rotator 340) before being sent to the vector unit (e.g., to properly align the format-converted samples with data lanes in the vector unit 140). The format-converted samples may also be selectively combined with format-converted samples corresponding to another read operation before being sent to the vector unit. This may be done to construct a desired set of samples for loading into the vector unit, as discussed above.

Figure 13:
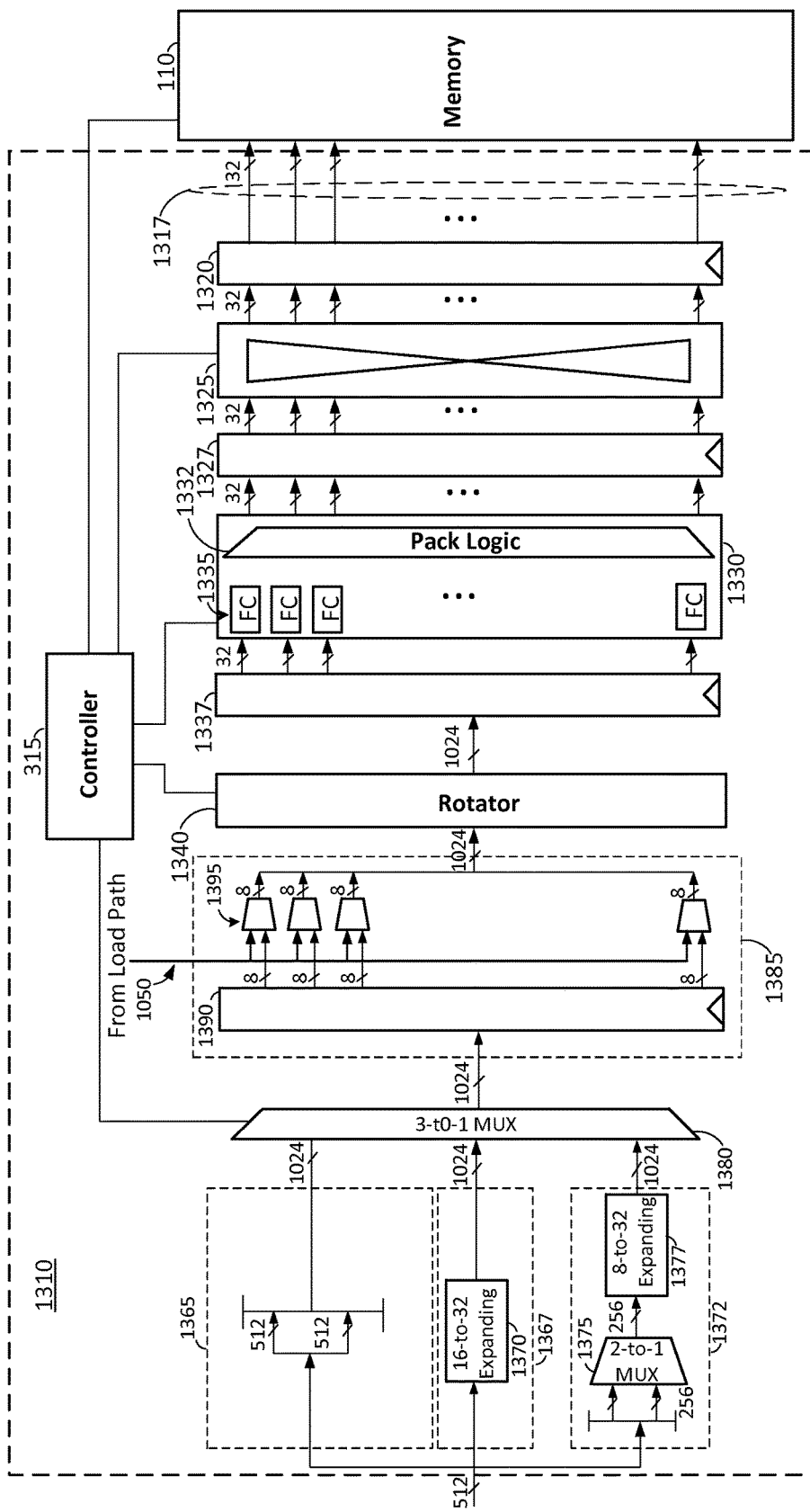
FIG. 13 shows an exemplary implementation of a store path for the load/store unit according to an embodiment of the present disclosure.

FIG. 13 shows an exemplary implementation of a store path 1310 of the load/store unit 235 according to an embodiment of the present disclosure. The store path 1310 is capable of performing on-the-fly format conversion of samples in the process of storing the samples from the vector unit 140 in the memory 110.

The store path 1310 comprises the controller 315, read-modify-write logic 1385, a rotator 1340, sample-conversion logic 1330, and a cross-bar circuit 1325. The sample-conversion logic 1330 comprises a plurality of format converters 1335 and pack logic 1332, and the read-modify-write logic 1385 comprises a line register 1390 and a plurality of multiplexers 1395. The store path 1310 also comprises a first datapath 1365, a second datapath 1367, a third datapath 1372, and a datapath multiplexer 1380. The store path 1310 further comprises a first latch 1337, a second latch 1327 and a third latch 1320.

In the example shown in FIG. 13, the input of the store path 1310 is coupled to vector unit 140 via a 512-bit bus for receiving samples to be stored in the memory 110. The output of the store path 1310 is coupled to the memory 110 via a 1024-bit memory bus 1317 comprising 32 32-bit data lanes, where each data lane corresponds to a respective bank of the memory 110. It is to be appreciated that embodiments of the present disclosure are not limited to the examples given above.

During a store operation, the controller 315 may read a plurality of samples (e.g., 32 samples) from the vector register file of the vector unit 140 for storage in the memory 110. In one embodiment, the store path 1310 is capable of receiving samples from the vector unit 140 in any one of a plurality of different sample widths. In the example shown in FIG. 13, the store path 1310 is capable of selectively receiving 32-bit samples, 16-bit samples or 8-bit samples from the vector unit 140. The first datapath 1365 is used to receive 32-bit samples from the vector unit 140, the second datapath 1367 is used to receive 16-bit samples from the vector unit 140, and the third datapath 1372 is used to receive 8-bit samples from the vector unit 140. The datapath multiplexer 1380 is configured to selectively couple one of the first, second, third datapaths 1365, 1367 and 1372 to the read-modify-write logic 1385 according to the width of the samples being received from the vector unit 140.

When the store path 1310 is to receive 32-bit samples from the vector unit 140, the controller 315 may instruct the multiplexer 1380 to couple the first datapath 1365 to the read-modify-write logic 1385. In this case, the first datapath 1365 may receive 32 32-bit samples from the vector unit 140 over two clock cycles, in which half of the samples are received in each clock cycle. The 32 32-bit samples may be input to the read-modify-write logic 1385.

When the store path 1310 is to receive 16-bit samples from the vector unit 140, the controller 315 may instruct the multiplexer 1380 to couple the second datapath 1367 to the read-modify-write logic 1385. In this case, the second datapath 1367 may receive 32 16-bit samples from the vector unit 140, and 16-to-32 expanding logic 1370 in the second datapath 1367 may expand each 16-bit sample into a 32-bit sample by padding the 16-bit sample with zeros. The resulting 32 32-bit samples may be input to the read-modify-write logic 1385.

When the store path 1310 is to receive 8-bit samples from the vector unit 140, the controller 315 may instruct the multiplexer 1380 to couple the third datapath 1372 to the read-modify-write logic 1385. In this case, the third datapath 1372 may receive two duplicates of 32 8-bit samples from the vector unit 140. A multiplexer 1375 in the third datapath 1372 may output one of the duplicates to 8-to-32 expanding logic 1377 in the third datapath 1372. The 8-to-32 expanding logic 1377 may expand each 8-bit sample into a 32-bit sample by padding the 8-bit sample with zeros. The resulting 32 32-bit samples may be input to the read-modify-write logic 1385.

The read-modify-write logic 1385 may selectively combine samples from the vector unit 140 with one or more samples read from the memory 110 to generate a set of samples to be written to the memory 110. As discussed further below, this may be done when write operations to the memory 110 are limited to bank boundaries and the samples received from the vector unit 140 are not aligned with bank boundaries in the memory 110.

The rotator 1340 receives the samples from the read-modify-write logic 1385. The rotator 1340 may then shift the positions of the samples. For example, the rotator 1340 may shift the positions of the samples to place the samples in a proper alignment for storage in the memory 110, as discussed further below. In one aspect, the controller 315 may send an offset value to the rotator 1340 indicating the number of sample positions by which to shift the samples.

The first latch 1337 latches the samples from the rotator 1340, and outputs the latched samples to the sample-conversion logic 1330. Each sample is transported to the sample-conversion logic 1330 via a respective data lane (e.g., 32-bit data lane). At the sample-conversion logic 1330, each sample is input to a respective one of the format converters 1335. Each format converter 1335 converts the format of the respective sample into a format in which the sample is to be stored in the memory 110. For example, each format converter 1335 may convert the numerical format of the respective sample. Each format converter 1335 may also change the width of the respective sample. For example, each format converter 1335 may reduce the width of the respective sample (e.g., convert a 32-bit sample into an 8-bit, 10-bit, 12-bit, 16-bit, 20-bit, or 24-bit sample). In one aspect, the controller 315 may send an instruction to the format converters 1335 indicating the format of the samples in the vector unit 140 and the format in which the samples are to be stored in the memory 110 so that the format converters 1335 perform the appropriate format conversion.

The pack logic 1332 packs the format-converted samples from the format converters 1335. For example, if each format-converted sample has a width of 12 bits, then the pack logic 1332 may pack the format-converted samples into 384 bits.

The second latch 1327 latches the samples from the pack logic 1332, and outputs the latched samples to the cross-bar circuit 1325. The cross-bar circuit 1325 is configured to reroute the data lanes on which the samples are transported. For example, the cross-bar circuit 1325 may be configured to couple any one of the data lanes at the input of the cross-bar circuit 1325 to any one of the data lanes at the output of the cross-bar circuit 1325. The controller 315 may use the cross-bar circuit 1325 to align the samples to the memory space in which the samples are to be stored in the memory 110, as discussed further below.

The third latch 1320 latches the samples from the cross-bar circuit 1325, and outputs the latched samples to the memory 110. The controller 315 then writes the samples in the desired memory addresses.

Various operations of the store path 1310 will now be described in further detail by way of examples. It is to be appreciated that the examples are merely illustrative and non-limiting.

Figure 14:
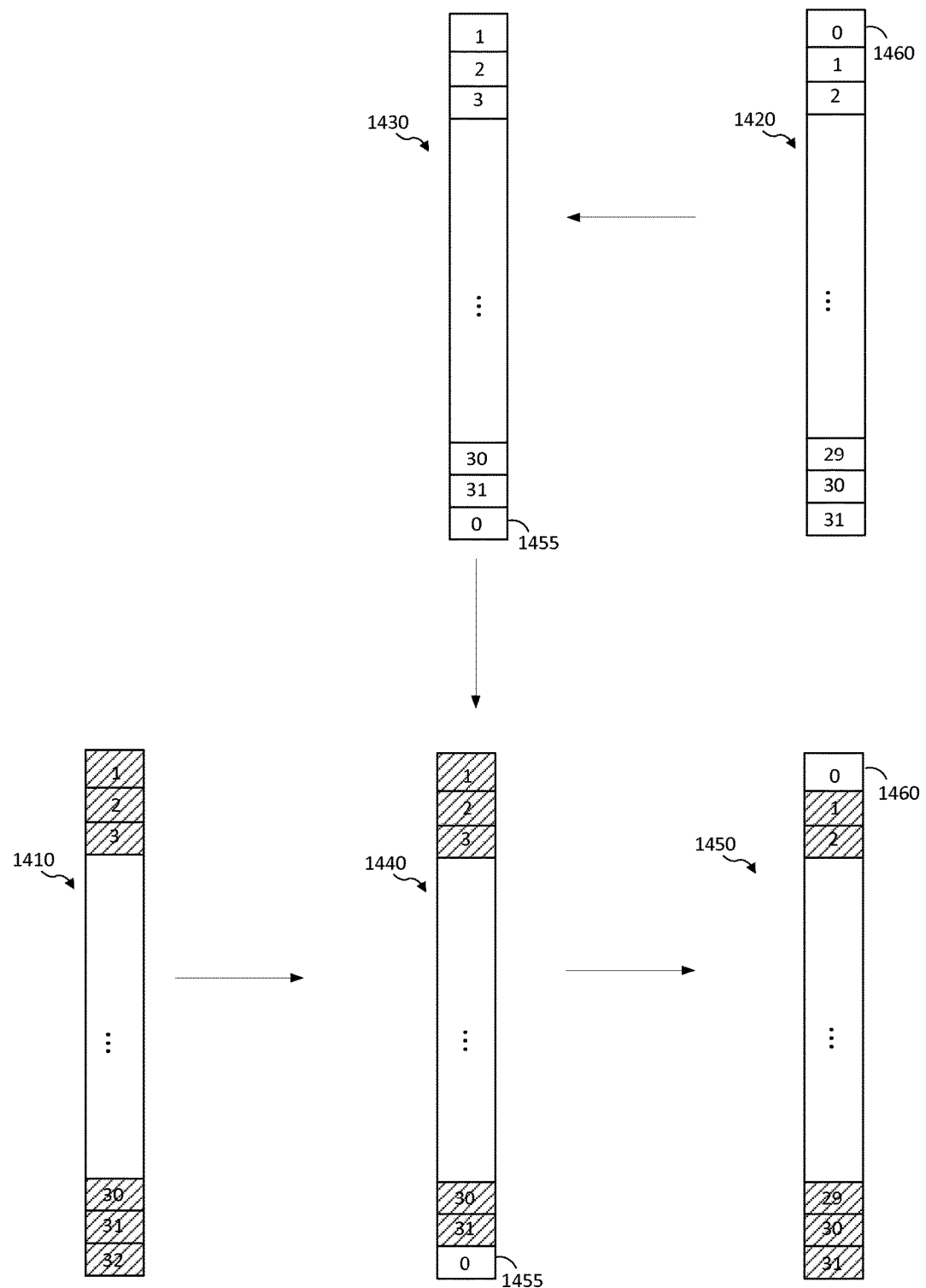
FIG. 14 shows an example of a read-modify-write operation according to an embodiment of the present disclosure.

FIG. 14 illustrates an example of a read-modify-write operation according to an embodiment of the present disclosure. FIG. 14 shows an exemplary set of samples 1410 read from the vector unit 140. The set of samples 1410 is temporarily held in the line register 1390 of the read-modify-write logic 1385. The exemplary set of samples 1410 includes updated samples 1 to 32, which are to be written to the memory 110 to update samples 1 to 32 in the memory 110. In FIG. 14, the updated samples are shaded to distinguish them from samples read from the memory 110.

In the example shown in FIG. 14, the set of samples 1410 is not aligned with bank boundaries in the memory 110. As a result, the set of samples 1410 may need to be written to the memory in two write operations. For example, the memory space for samples 0 to 31 in the memory 110 may be aligned with bank boundaries, in which sample 0 and sample 1 may be located in the same bank in the memory 110. As a result, the controller 315 may not be able to write updated sample 1 to the memory 110 without overwriting sample 0 (which is not being changed). In this example, the controller 315 may write to the memory space for samples 0 to 31 in a first write operation, in which the controller 315 overwrites samples 1 to 31 in the memory 110 with updated samples 1 to 31 from the vector unit 140 and rewrites sample 0 in the memory 110, thereby leaving sample 0 unchanged.

In this regard, the controller 315 may read samples 0 to 31 from the memory 110 and input the samples to the load path 1010 (shown in FIG. 10). In the load path 1010, the cross-bar circuit 325 may concatenate the samples, as discussed above. The unpack logic 332 may then unpack the samples and send each unpacked sample to the respective format-converter 335. In one aspect, each format-converter 335 expands the respective sample to 32 bits (e.g., by padding the sample with zeros) and outputs the expanded sample to the respective data lane (e.g., 32-bit data lane). The expansion expands the width of the respective sample to 32 bits while allowing the original value of the sample to be recovered (e.g., by removing the zero padding), as discussed further below. FIG. 14 shows the set of samples 1420 output from the format-converters 335 in the load path 1010. The rotator 1040 then shifts the samples resulting in a set of shifted samples 1430, in which the sample that is not being changed (sample 0 in this example) is properly aligned with respect to the samples read from the vector unit 140. In the example shown in FIG. 14, sample 0 is shifted to position 1455.

In the store path 1310 (shown in FIG. 13), the read-modify-write logic 1385 receives the samples from the load path 1010 via path 1050, and selectively combines one or more samples from the load path 1010 with updated samples from the vector unit 140 to form a set of samples to be written to the memory 110. In the example shown in FIG. 14, sample 0 from the load path 1010 is combined with updated samples 1 to 31 to form a set of samples 1440 to be written to the memory 110. To do this, each multiplexer 1395 in the read-modify-write logic 1385 receives a portion (e.g., 8-bits) of the samples from the load path 1010 and a portion (8-bits)

of the updated samples from the line register 1390, and selects the portion to be included in the set of samples to be written to the memory 110. In the example shown in FIG. 14, the multiplexers 1395 corresponding to position 1455 select sample 0 from the load path 1010 while the other multiplexers 1395 select the updated samples from the line register 1390.

In the example in shown in FIG. 14, the set of samples 1440 to be written to the memory 110 includes updated sample 1 to 31 and sample 0 read from the memory 110. The rotator 1340 in the store path 1310 then shifts (rotates) the samples in the set of samples 1440 to place them in proper alignment for storage in the memory 110, resulting in a shifted set of samples 1450. The rotation by the rotator 1340 in the store path 1310 may be the opposite of the rotation by the rotator 1040 in the load path 1010. In other words, the rotation by the rotator 1340 in the store path 1310 may undo the rotation of the sample not being updated (e.g., sample 0) by the rotator 1040 in the load path 1010. As a result, sample 0 may be restored to its position 1460 before rotation by the rotator 1040 in the load path 1010, as shown in FIG. 14.

Each sample in the set of samples 1450 may be input to a respective one of the format-converters 1335 in the store path 1310 via a respective data lane (e.g., 32-bit data lane). The format-converters 1335 corresponding to the updated samples may perform format conversion on the updated samples in parallel to convert the updated samples into a format in which they are to be stored in memory 110. For example, each format-converter 1335 corresponding to an updated sample may convert the respective updated sample from a floating point number format to a fixed point number format, or vice versa. The format conversion may involve reducing the width of the respective updated sample.

Each format converter 1335 corresponding to a sample read from the memory 110 may reduce the sample to its original width before expansion by the corresponding format converter 335 in the load path 1010. The format converter 1335 may do this by removing the padding (e.g., zero padding) added by the corresponding format converter 335 in the load path 1010. As a result, the original sample read from the memory 110 may be restored. In the example shown in FIG. 14, the format converter 1335 corresponding to sample 0 may reduce the width of sample 0 by removing padding added by the corresponding format converter 335 in the load path 1010.

Thus, the format converters 1335 corresponding to the updated samples and the format converters 1335 corresponding to the samples read from the memory 110 may perform different format conversions. The format converters 1335 corresponding to the updated samples convert the format of the updated samples from a format in which they are output by the vector unit 140 into a format in which they are to be stored in the memory 110. The format converters 1335 corresponding to the read samples undo the expansion by the format converters 335 in the load path 1010 (e.g., by removing padding).

The pack logic 1332 in the store path 1310 may then pack the samples from the format converters 1335 into packed samples. For example, if the samples from the format converters 1335 each have a width of 12-bits, then the pack logic 1332 may pack the samples into 384 bits.

Figure 15:
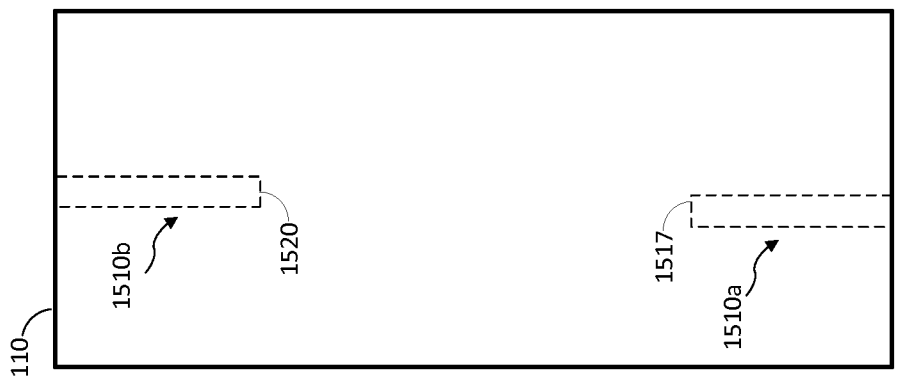
FIG. 15 shows an example of memory space in which samples are to be written to the memory according to an embodiment of the present disclosure.

The cross-bar circuit 1325 may then reroute the data lanes on which the packed samples are transported, for example, to align the packed samples with the memory space in which the packed samples are to be stored. In this regard, FIG. 15 shows an example of a memory space into which the packed samples are to be written. In this example, the memory space comprises a first portion 1510*a* and a second portion 1510*b*, which may be in different rows in the memory 110. A first one of the packed samples is to be aligned with boundary 1517 of the first portion 1510*a*, and a last one of the packed samples is to be aligned with boundary 1520 of the second portion 1510*b*. Each portion 1510*a* and 1510*b* of the memory space may span a multiple of the bank width (e.g., 32 bits) and may be aligned with bank boundaries in the memory 110.

Figure 16:
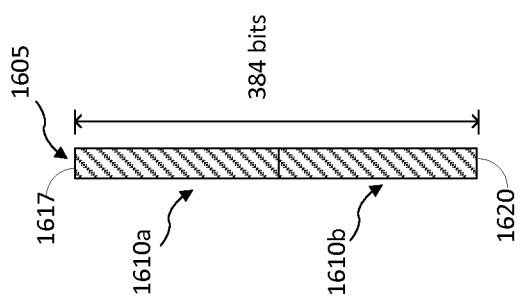
FIG. 16 shows an example of samples input to a cross-bar circuit according to an embodiment of the present disclosure.

FIG. 16 shows an example of the packed samples 1605 input to the cross-bar circuit 1325. In this example, the packed samples 1605 comprises a first portion 1610*a* to be written to the first portion 1510*a* of the memory space, and a second portion 1610*b* to be written to the second portion 1510*b* of the memory space. Each portion 1610*a* and 1610*b* may span a multiple of a bank width. Boundary 1617 is aligned with the first one of the packed samples 1605, and boundary 1620 is aligned with the last one of the packed samples 1605. For the non-limiting example in which each packed sample comprises 12-bits, the packed samples 1605 may span 384 bits, as shown in FIG. 16. It is to be appreciated that each packed sample may comprise a different number of bits.

Figure 17:
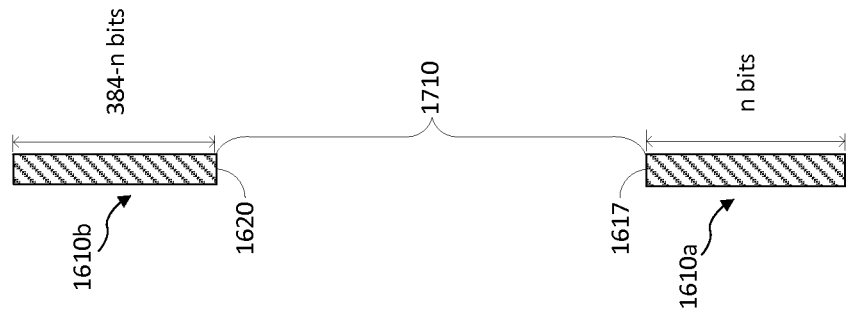
FIG. 17 shows an example of the samples output by the cross-bar circuit according to an embodiment of the present disclosure.

FIG. 17 shows an example of the output of the cross-bar circuit 1325, in which the cross-bar circuit 1325 aligns the first and second portions 1610*a* and 1610*b* of the packed samples 1605 with the first and second portions 1510*a* and 1510*b* of the memory space, respectively. The cross-bar 1325 does this by rerouting the data lanes on which the packed samples are transported. In this example, the first and second portions 1610*a* and 1610*b* of the packed samples 1605 may be separated by a space 1710 corresponding to the space between the first and second portions 1510*a* and 1510*b* of the memory space in the memory 110. The packed samples 1605 may then be written to the first and second portions of the memory space in the memory 110.

Thus, in the example shown in FIG. 14, updated samples 1-31 are written to the memory 110 and sample 0 is rewritten to the memory 110 during the first write operation. Although samples 0-31 were read from the memory in this example, it is to be appreciated that only a subset of these samples may have been read from the memory 110. This is because, in this example, only sample 0 needs to be combined with updated samples 1-31 to align the first write operation with bank boundaries. Updated sample 32 may be written to the memory 110 in the second write operation in a similar manner as updated samples 1-31 discussed above.

In one embodiment, the store path 1310 is capable of selectively operating in a format-conversion mode or a bypass mode, similar to the load path 1010. In the format-conversion mode, the store path 1310 operates in the same manner discussed above. In the bypass mode, the store path 1310 stores data samples from the vector unit 140 in the memory 110 without format conversion. This mode may be selected, for example, when the samples are to be stored in the memory 110 in the same format in which they are output by the vector unit 140.

In the example shown in FIG. 13, the store path 1310 is capable of operating in the bypass mode for 8-bit samples or 16-bit samples that do not require format conversion. Operations of the store path 1310 in the bypass mode will now be described by way the following examples, although it is to be appreciated that embodiments of the present disclosure are not limited to these examples.

For 8-bit samples that do not require format conversion, the controller 315 may read 128 8-bit updated samples from the vector unit 140, which are received by the read-modifywrite logic 1385 via the first datapath 1365. If the updated samples are not aligned with bank boundaries in the memory, then the read-modify-write logic 1385 may combine the updated samples with one or more samples read from the memory 110 to generate one or more sets of samples that are aligned with bank boundaries. Each generated set of samples may be written to the memory 110 in a separate write operation.

Figure 18:
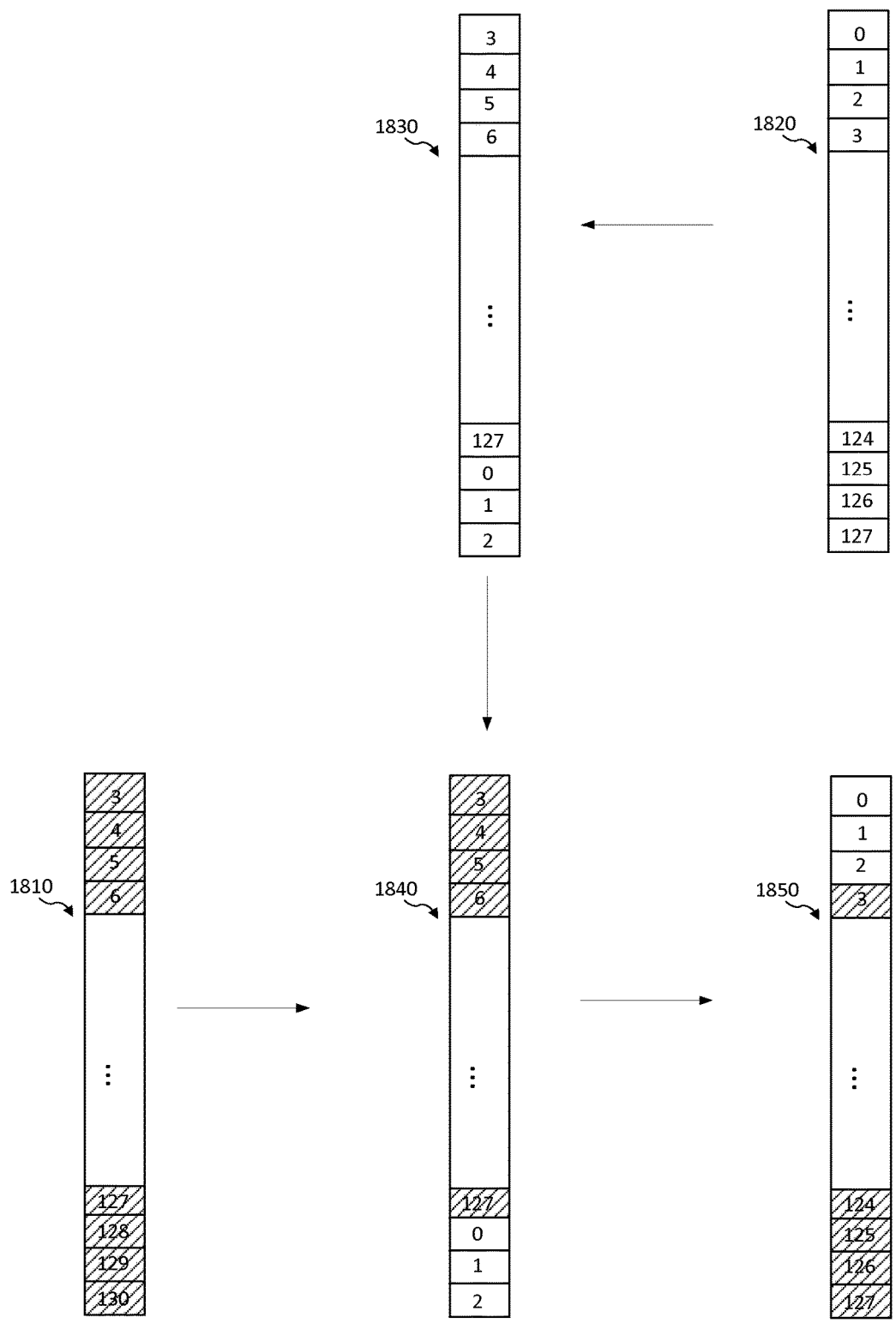
FIG. 18 shows an example of a read-modify-write operation in a bypass mode according to an embodiment of the present disclosure.

In this regard, FIG. 18 illustrates an example of a read-modify-write operation according to an embodiment of the present disclosure. FIG. 18 shows an exemplary set of 8-bit samples 1810 read from the vector unit 140 in the bypass mode. The exemplary set of samples 1810 includes updated samples 3 to 130, which are to be written to the memory 110 to update samples 3 to 130 in the memory 110. In FIG. 18, the updated samples are shaded to distinguish them from samples read from the memory 110.

In the example shown in FIG. 18, the set of samples 1810 is not aligned with bank boundaries in the memory 110. As a result, the set of samples 1810 may need to be written to the memory in two write operations. For example, the memory space for samples 0 to 127 in the memory 110 may be aligned with bank boundaries. In this case, the read-modify-write logic 1385 may combine samples 0-2 read from the memory 110 with updated samples 3-127 to generate a first set of samples 1840. To do this, the controller 315 may read samples 0-127 from the memory 110, which are input to the load path 1010. The controller 315 may instruct cross-bar circuit 325 to concatenate the samples resulting in a set of samples 1820. The set of samples 1820 may pass through the sample-conversion logic 1030 without unpacking and format conversion. The rotator 1040 may then shift (rotate) the positions of the read samples to generate a shifted set of samples 1830, in which the read samples 0-2 are properly aligned with respect to updated samples 3-127 from the vector unit 140.

The write-modify-write logic 1385 may then combined updated samples 3-127 with read samples 0-2 to generate the first set of samples 1840. The rotator 1340 receives the first set of samples 0-127 from the read-modify-write logic 1385, and shifts (rotates) the positions of the samples resulting in a shifted set of samples 1850. The rotation by the rotator 1340 in the store path 1310 may perform the opposite of the rotation by the rotator 1040 in the load path 1010. The cross-bar circuit 325 may reroute the data lanes on which samples in the shifted set of samples are transported to, for example, align the samples with the memory space in which they are to be stored in the memory 110. The samples may then be written to the memory 110. Updated sample 128-130 may be written to the memory 110 in the second write operation in a similar manner as updated samples 3-127 discussed above.

For 16-bit samples that do not require format conversion, the controller 315 may store the samples in the memory 110 in a similar manner as that described above for 8-bit samples.

Figure 19:
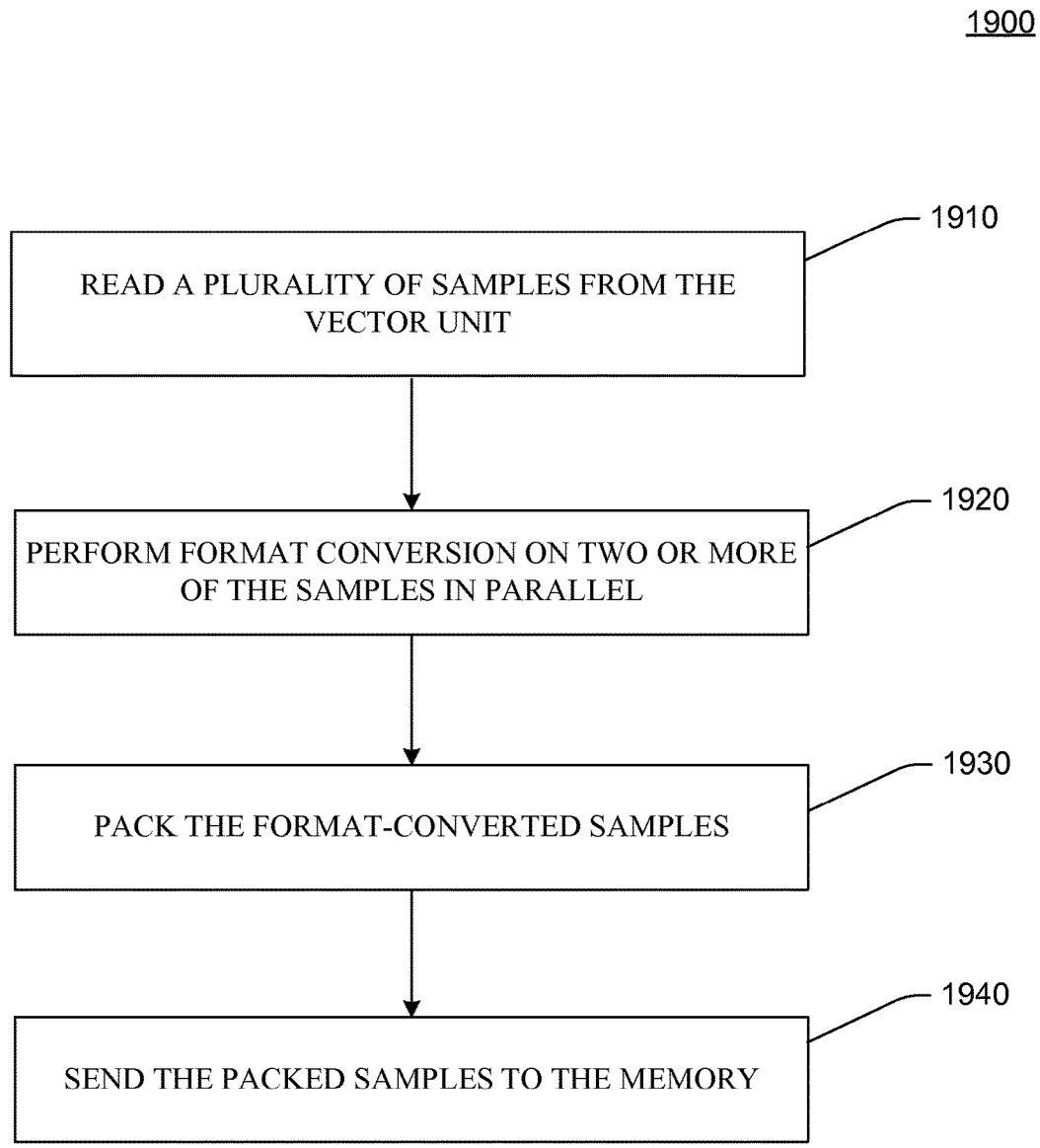
FIG. 19 is a flow diagram illustrating a method for storing data samples in a memory according to an embodiment of the present disclosure.

FIG. 19 is a flow diagram illustrating a method 1900 for storing data samples from a vector unit in a memory according to an embodiment of the present disclosure.

In step 1910, a plurality of samples are read from the vector unit. For example, a controller (e.g., controller 315) may read the samples from the vector unit (e.g., from a vector register file of the vector unit 140).

In step 1920, format conversion is performed on two or more of the samples in parallel. For example, each sample may be input to a respective one of a plurality of format converters (e.g., format converters 1335), where each format converter performs format conversion on the respective sample.

In step 1930, the format-converted samples are packed. For example, the format-converted samples may be packed by pack logic (e.g., pack logic 1332). In step 1940, the packed samples are sent to the memory.

The vector unit 140 may be used in a modem (e.g., a Long Term Evolution (LTE) modem) of a User Equipment (UE) (e.g., a wireless mobile device). In this example, the UE may include a receiver that receives data and/or control signals over a wireless link, and processes (e.g., filters, amplifies, digitizes, etc.) the received signals into data samples that are temporarily stored in the memory 110, where they are accessible by the vector unit 140 for processing. The vector unit 140 may comprise reconfigurable datapaths, logic and arithmetic devices (e.g., adders, multiplexers, accumulators, etc.) that can be programmed to perform various vector operations related to the modem, including, for example, Fast Fourier Transform, channel estimation, demodulation, demapping, etc. It is to be appreciated that embodiments of the present disclosure are not limited to this example, and that embodiments of the present disclosure may be used in other applications suitable for vector processing.

Those skilled in the art will appreciate that the various illustrative blocks, and steps described in connection with the disclosure herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative blocks described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection may be properly termed a computer-readable medium to the extent involving non-transient storage of transmitted signals. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium, to the extent the signal is retained in the transmission chain on a storage medium or device memory for any non-transient length of time. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A method for loading a data vector from a memory into a vector unit, comprising:
    reading a plurality of samples from the memory with a load/store unit, wherein the plurality of samples are packed in the memory;
    unpacking the samples with an unpack logic in the load/store unit including determining the boundaries between samples stored in the memory based on a size of each sample to obtain a plurality of unpacked samples for providing each unpacked sample of the plurality of unpacked samples to a respective one of a plurality of format converters;
    performing format conversion on the unpacked samples in parallel using the plurality of format converters in the load/store unit;
    packing at least a portion of the format-converted samples to obtain a plurality of packed format-converted samples; and
    sending at least a portion of the packed format-converted samples to the vector unit, wherein the at least a portion of the packed format-converted samples are in a format usable by the vector unit.

2. The method of claim 1, wherein performing format conversion on the unpacked samples comprises converting a numerical format of each of the unpacked samples.

3. The method of claim 1, wherein performing format conversion on the unpacked samples comprises converting a width of each of the unpacked samples.

4. The method of claim 3, wherein converting the width of each of the unpacked samples comprises padding each of the unpacked samples.

5. The method of claim 1, further comprising shifting positions of the format-converted samples before packing the at least the portion of the format-converted samples.

6. The method of claim 5, further comprising:
    combining one or more of the packed shifted format-converted samples with one or more samples from a second plurality of samples to obtain a combined set of samples; and
    sending the combined set of samples to the vector unit.

7. A method for loading a data vector from a memory into a vector unit, comprising:
    reading a first plurality of samples from the memory with a load/store unit, wherein the first plurality of samples are packed in the memory;
    unpacking the first plurality of samples with an unpack logic in the load/store unit to obtain a plurality of unpacked samples;
    performing format conversion on the unpacked samples in parallel using a plurality of format converters in the load/store unit;
    shifting positions of the format-converted samples;
    holding the shifted format-converted samples in a latch;
    overwriting one or more of the shifted format-converted samples in the latch with one or more samples from a second plurality of samples to obtain a combined set of samples, the combined set of samples including a portion of the shifted format-converted samples and a portion of the second plurality of samples; and
    sending the combined set of samples to the vector unit with the load/store unit, wherein the combined set of samples are in a format usable by the vector unit.

8. An apparatus for loading a data vector from a memory into a vector unit, comprising:
    means for reading a plurality of samples from the memory with a load/store unit, wherein the plurality of samples are packed in the memory;
    means for unpacking the samples in the load/store unit, the means for upacking configured to determine the boundaries between samples stored in the memory based on a size of each sample to obtain a plurality of unpacked samples for providing each unpacked sample of the plurality of unpacked samples to a respective one of a plurality of format converters;
    means for performing format conversion on the unpacked samples in parallel using the plurality of format converters in the load/store unit;
    means for packing at least a portion of the format-converted samples to obtain a plurality of packed format-converted samples; and
    means for sending at least a portion of the packed format-converted samples to the vector unit, wherein the portion of the packed format-converted samples are in a format usable by the vector unit.

9. An apparatus for loading a data vector from a memory into a vector unit, comprising:
a controller configured to read a plurality of samples from the memory, wherein the plurality of samples are packed in the memory;
a cross-bar circuit coupled to the memory via a first plurality of parallel data lanes, wherein the cross-bar circuit is configured to concatenate the first and second portions of the read samples to obtain concatenated samples;
unpack logic configured to unpack the samples including determining the boundaries between samples stored in the memory based on a size of each sample to obtain a plurality of unpacked samples for providing each unpacked sample of the plurality of unpacked samples to a respective one of a plurality of format converters, wherein the unpack logic is further configured to unpack the concatenated samples to obtain the plurality of unpacked samples;
a plurality of format converters, wherein the unpack logic is configured to input each unpacked sample to a respective one of the plurality of format converters arranged in parallel, and each format converter is configured to perform format conversion on the respective unpacked sample; and
an output latch configured to output at least a portion of the format-converted samples to the vector unit.

10. The apparatus of claim 9, wherein each format converter is configured to convert a numerical format of the respective unpacked sample.

11. The apparatus of claim 9, wherein each format converter is configured to convert a width of the respective unpacked sample.

12. The apparatus of claim 11, wherein each format converter is configured to convert the width of the respective unpacked sample by padding the respective unpacked sample.

13. The apparatus of claim 9, further comprising a rotator between the plurality of format converters and a packing logic configured to pack at least a portion of the format-converted samples to obtain a plurality of packed format-converted samples, wherein the rotator is configured to shift positions of the format-converted samples before the packing logic packs the at least the portion of the format-converted samples.

14. The apparatus of claim 13, wherein the output latch is configured to combine one or more of the packed shifted format-converted samples with one or more samples from a second plurality of samples to obtain a combined set of samples, and to output the combined set of samples to the vector unit.

15. A method for storing a data vector from a vector unit in a memory, comprising:
reading a plurality of samples from the vector unit with a load/store unit;
expanding the plurality of samples to obtain expanded samples using at least one expanding logic;
performing format conversion on two or more of the expanded samples in parallel using a plurality of format converters;
packing the format-converted samples with a pack logic; and
sending the packed samples to the memory for storage in the memory.

16. The method of claim 15, wherein performing format conversion on the two or more of the expanded samples comprises converting a numerical format of each of the two or more of the samples.

17. The method of claim 15, wherein performing format conversion on the two or more of the expanded samples comprises converting a width of each of the two or more of the samples.

18. The method of claim 17, wherein converting the width of each of the two or more of the expanded samples comprises padding each of the two or more of the samples.

19. The method of claim 15, further comprising shifting positions of the two or more expanded samples before performing format conversion on the two or more expanded samples.

20. The method of claim 15, further comprising:
reading one or more samples from the memory; and
combining the two or more expanded samples with the one or more samples from the memory to obtain a combined set of samples.

21. The method of claim 20, wherein the combined set of samples is aligned with bank boundaries in the memory.

22. The method of claim 1, wherein packing the at least the portion of the format-converted samples comprises removing padding from each of the samples in the at least the portion of the format-converted samples.

23. An apparatus for loading a data vector from a memory into a vector unit, comprising:
a controller configured to read a plurality of samples from the memory, wherein the plurality of samples are packed in the memory;
a cross-bar circuit coupled to the memory via a plurality of parallel data lanes, wherein the cross-bar circuit is configured to receive a first portion of the read samples over a first subset of the data lines, to receive a second portion of the read samples over a second subset of the data lines, and to concatenate the first and second portions of the read samples to obtain concatenated samples;
unpack logic configured to unpack the concatenated samples to obtain a plurality of unpacked samples;
a plurality of format converters, wherein the unpack logic is configured to input each unpacked sample to a respective one of the plurality of format converters, and each format converter is configured to perform format conversion on the respective unpacked sample; and
an output latch configured to output at least a portion of the format-converted samples to the vector unit.

24. The apparatus of claim 23, wherein the cross-bar circuit is coupled to the unpack logic via a second plurality of parallel data lines, and the cross-bar circuit is configured to output the concatenated samples to the unpack logic over a subset of the second plurality of data lines.

25. The apparatus of claim 23, wherein the cross-bar circuit is further configured to reposition the first and second portions of the read samples with respect to one another.

26. The apparatus of claim 23, wherein the second subset of the data lines are spaced apart from the first subset of the data lines by one or more other ones of the data lines.

27. The apparatus of claim 9, wherein the cross-bar circuit is coupled to the unpack logic via a second plurality of parallel data lines, and the cross-bar circuit is configured to output the concatenated samples to the unpack logic over a subset of the second plurality of data lines.

28. The apparatus of claim 9, wherein the cross-bar circuit is further configured to reposition the first and second portions of the read samples with respect to one another.

29. The apparatus of claim 9, wherein the second subset of the data lines are spaced apart from the first subset of the data lines by one or more other ones of the data lines.

30. The apparatus of claim 9, further comprising:
   packing logic configured to pack at least a portion of the format-converted samples to obtain a plurality of packed format-converted samples;
   wherein the output latch is further configured to output at least a portion of the packed format-converted samples to the vector unit.

* * * * *